Oct. 20, 1936.  C. P. PUTNAM ET AL  2,058,352
CALENDER MACHINE
Filed Sept. 2, 1932  17 Sheets-Sheet 1

Inventors:
Charles P. Putnam
Carl E. Berry
Lloyd Hornbostel
By Wilson, Bowell, McCanna & Rehm
Attys.

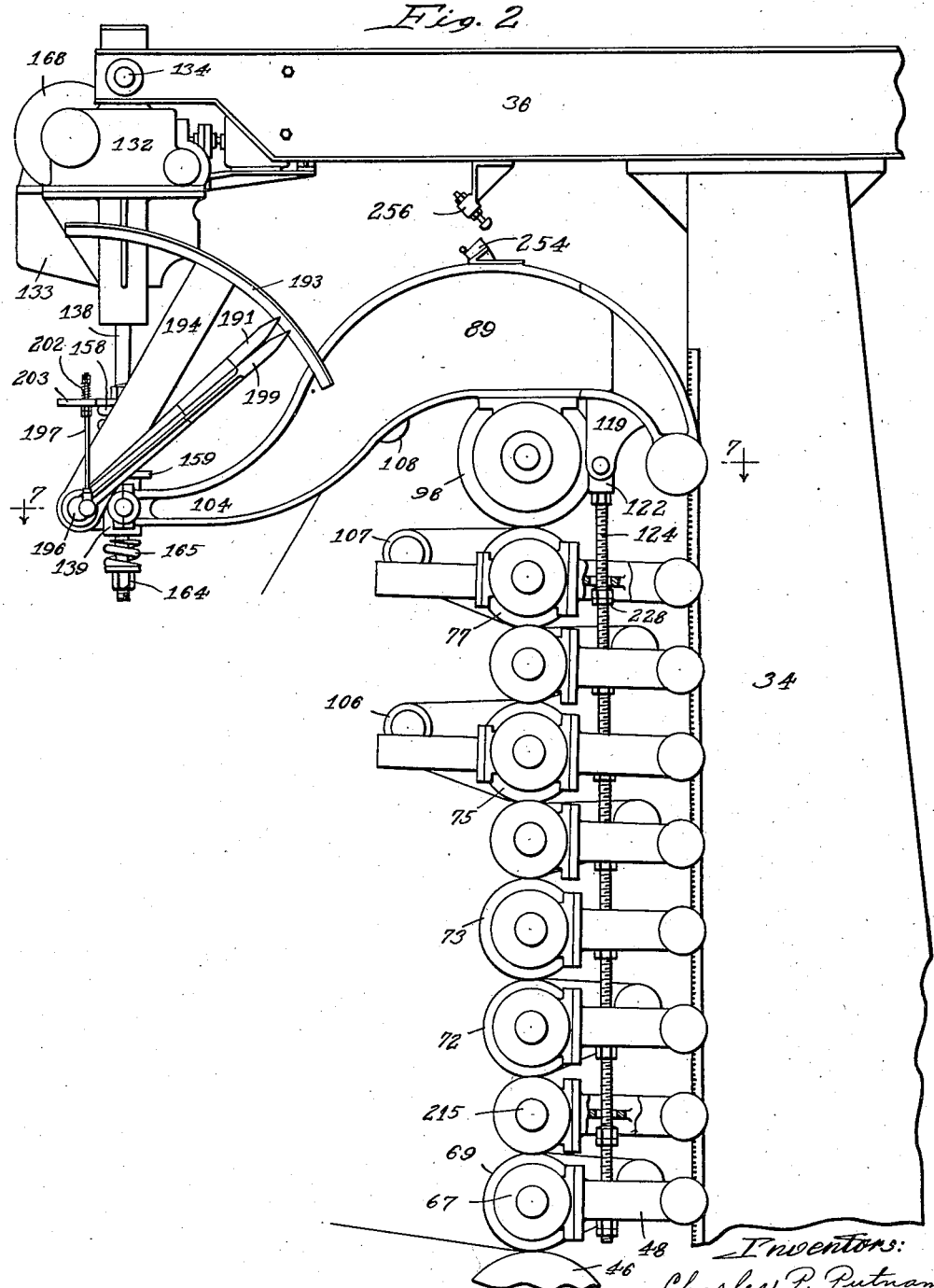

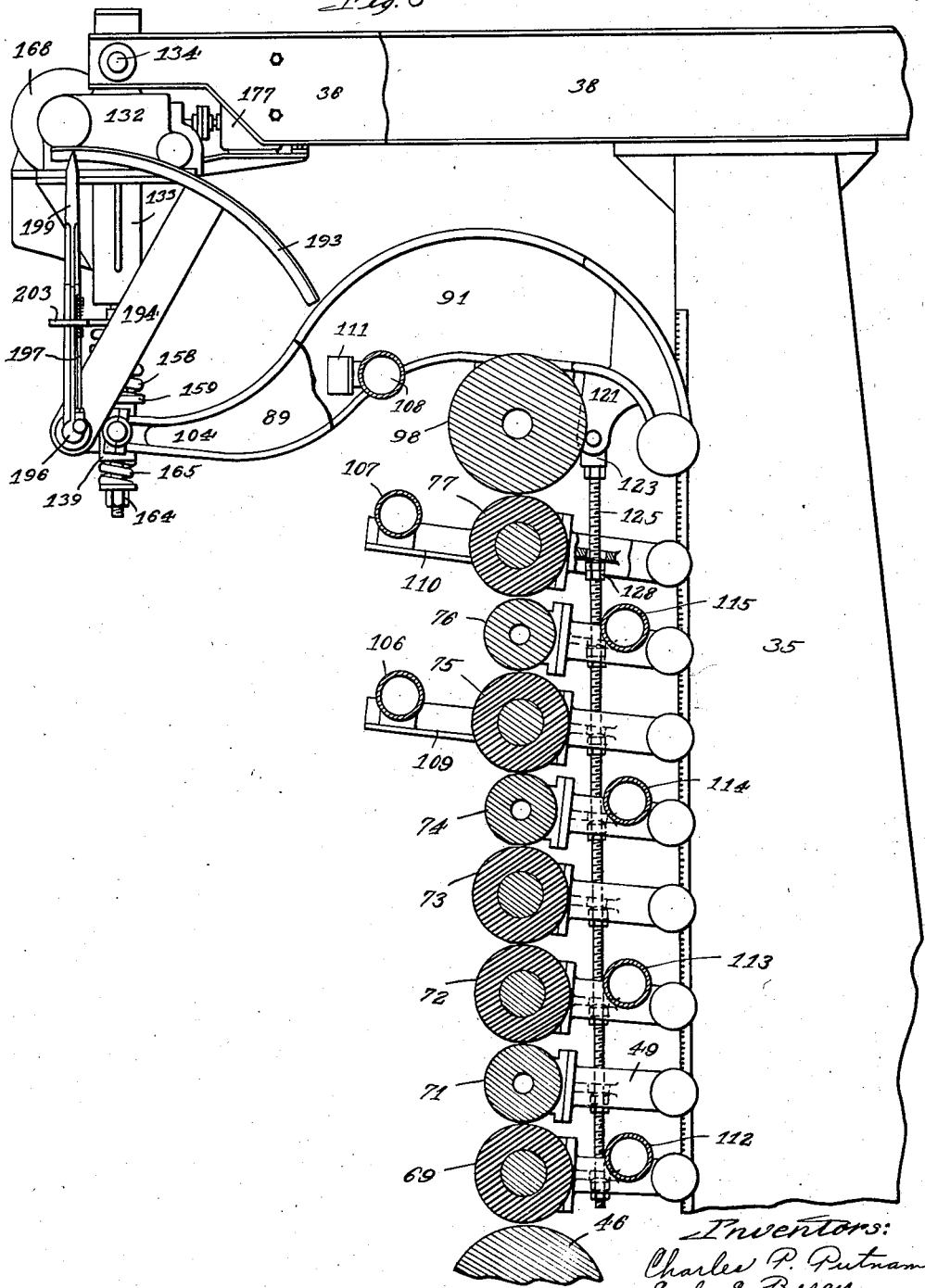

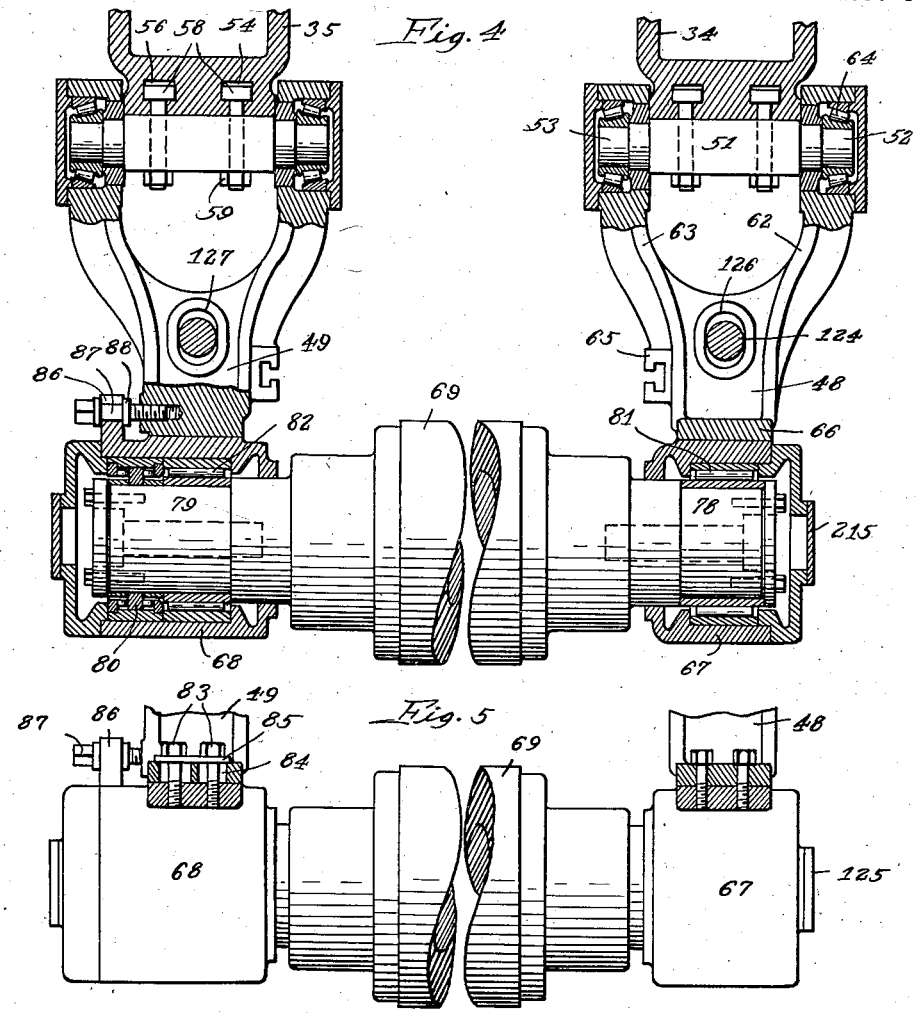

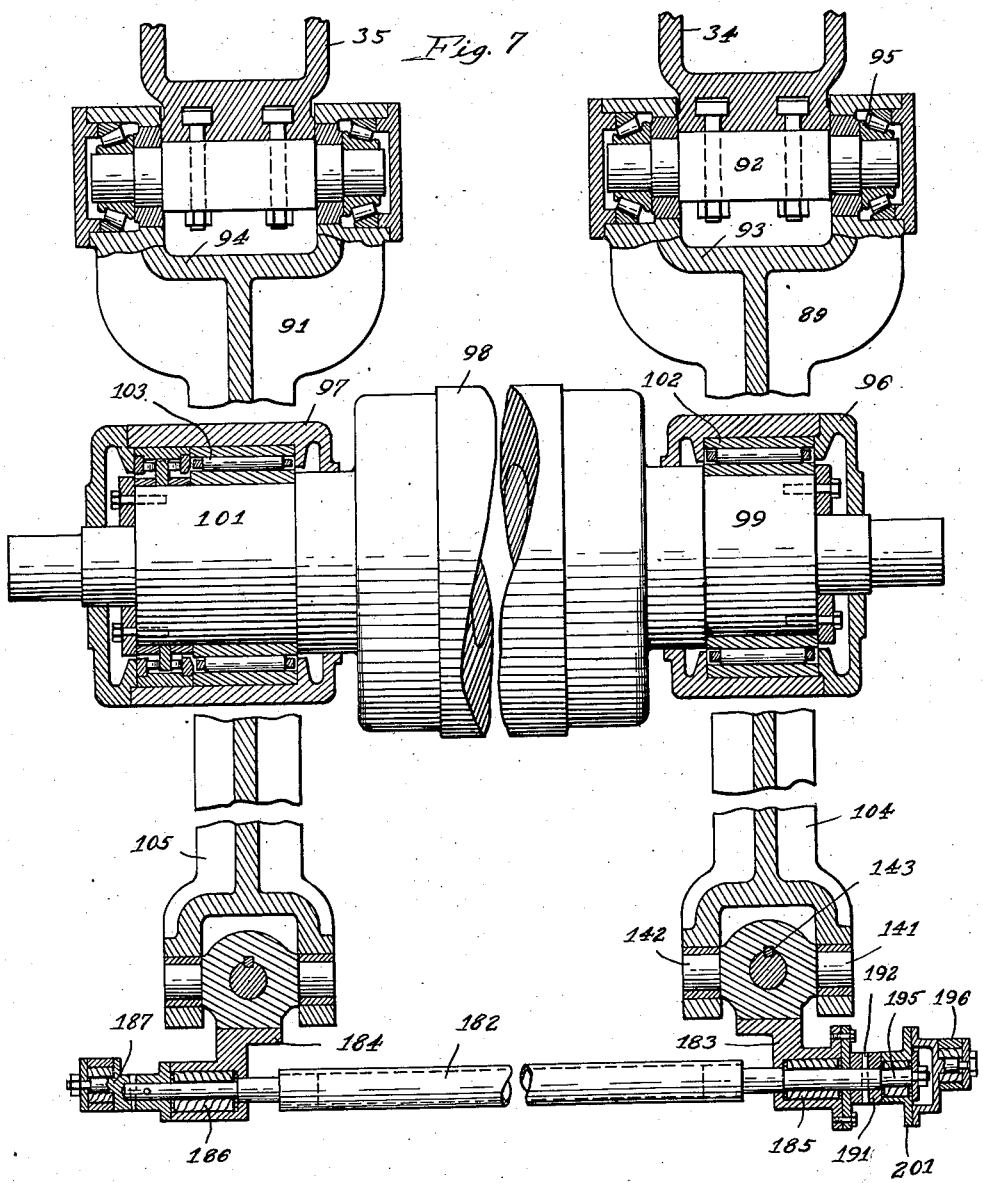

Oct. 20, 1936.  C. P. PUTNAM ET AL  2,058,352
CALENDER MACHINE
Filed Sept. 2, 1932  17 Sheets-Sheet 6

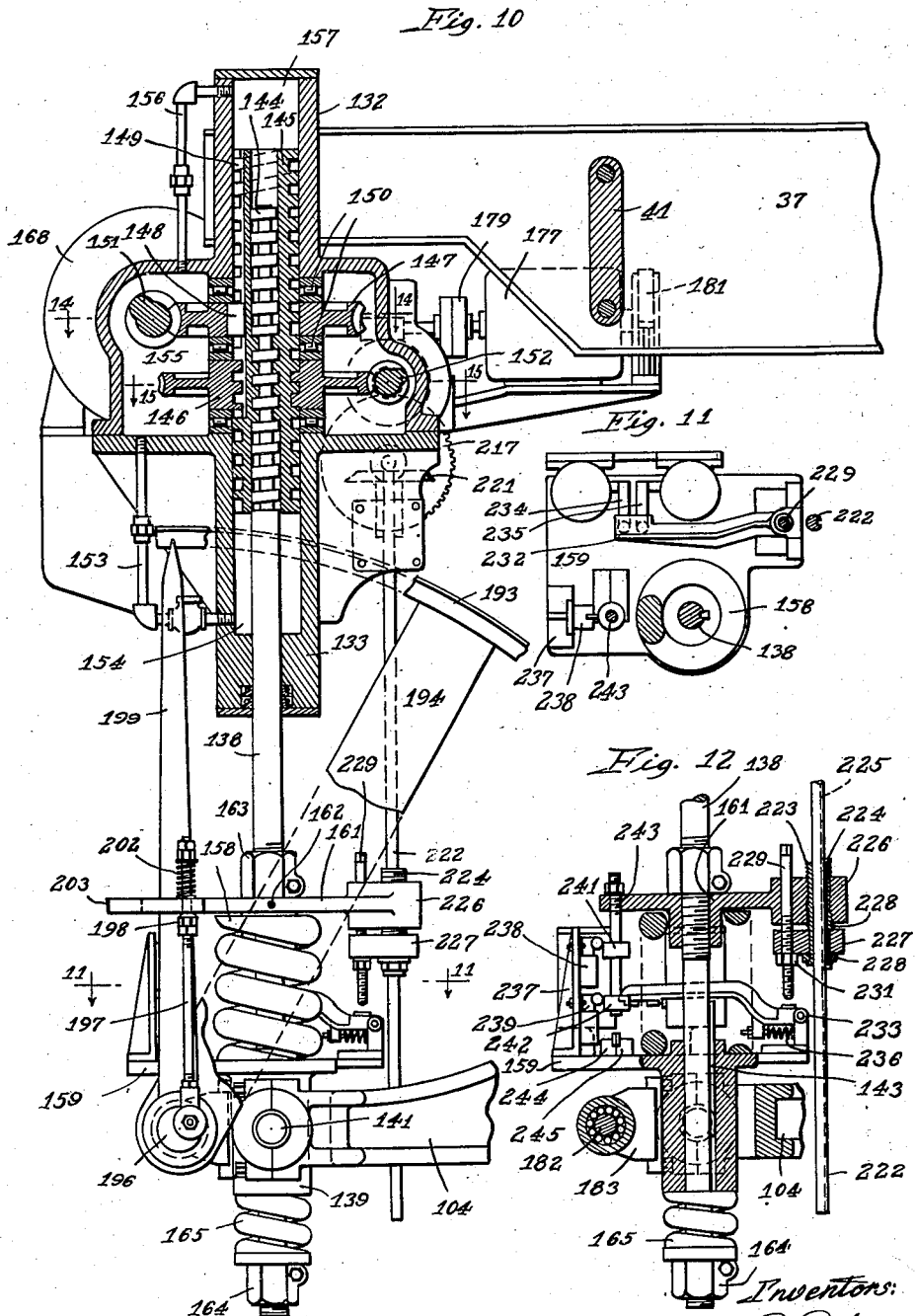

Oct. 20, 1936.    C. P. PUTNAM ET AL    2,058,352
CALENDER MACHINE
Filed Sept. 2, 1932    17 Sheets-Sheet 8
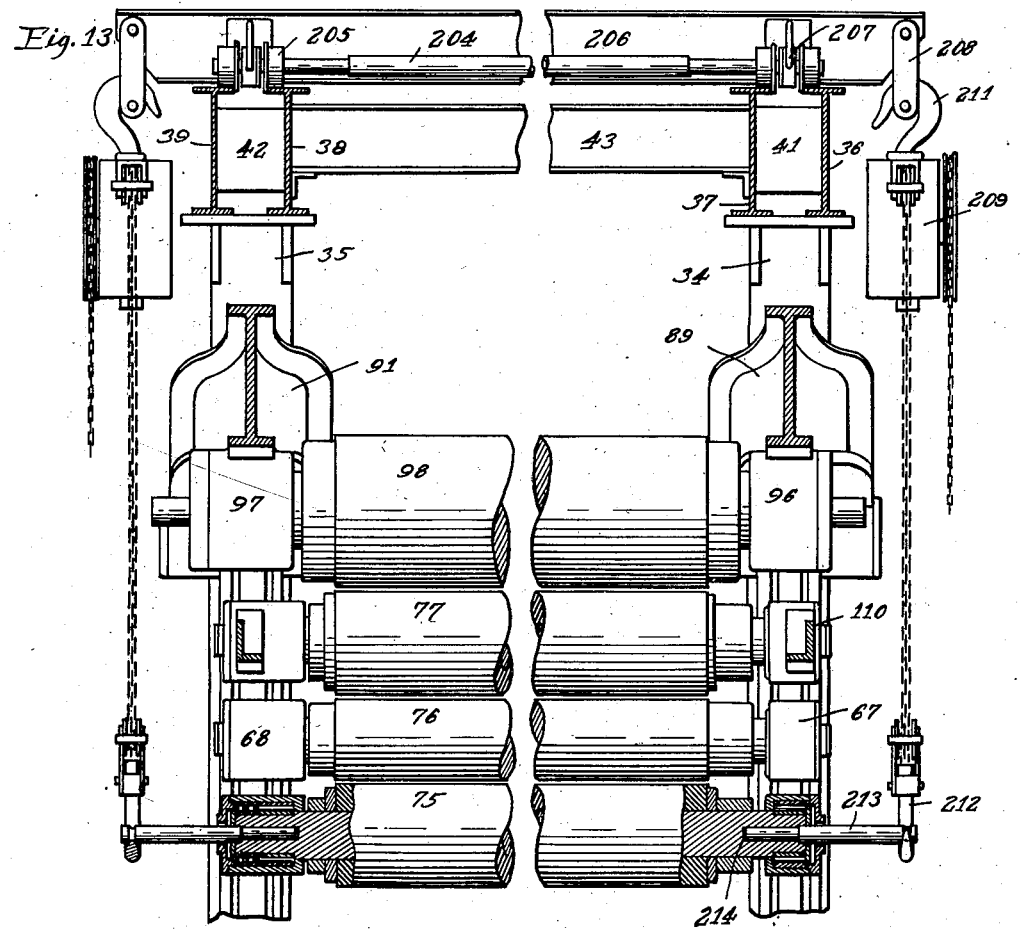
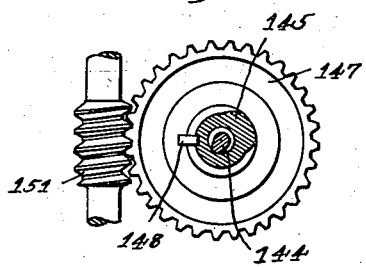
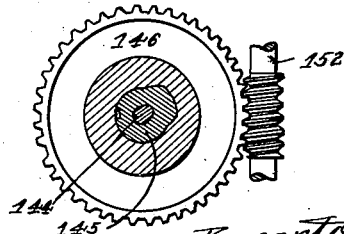
Inventors:
Charles P. Putnam
Earl E. Berry
Lloyd Hornbostel
By Wilson, Dowell, McCanna & Rehm
Attys.

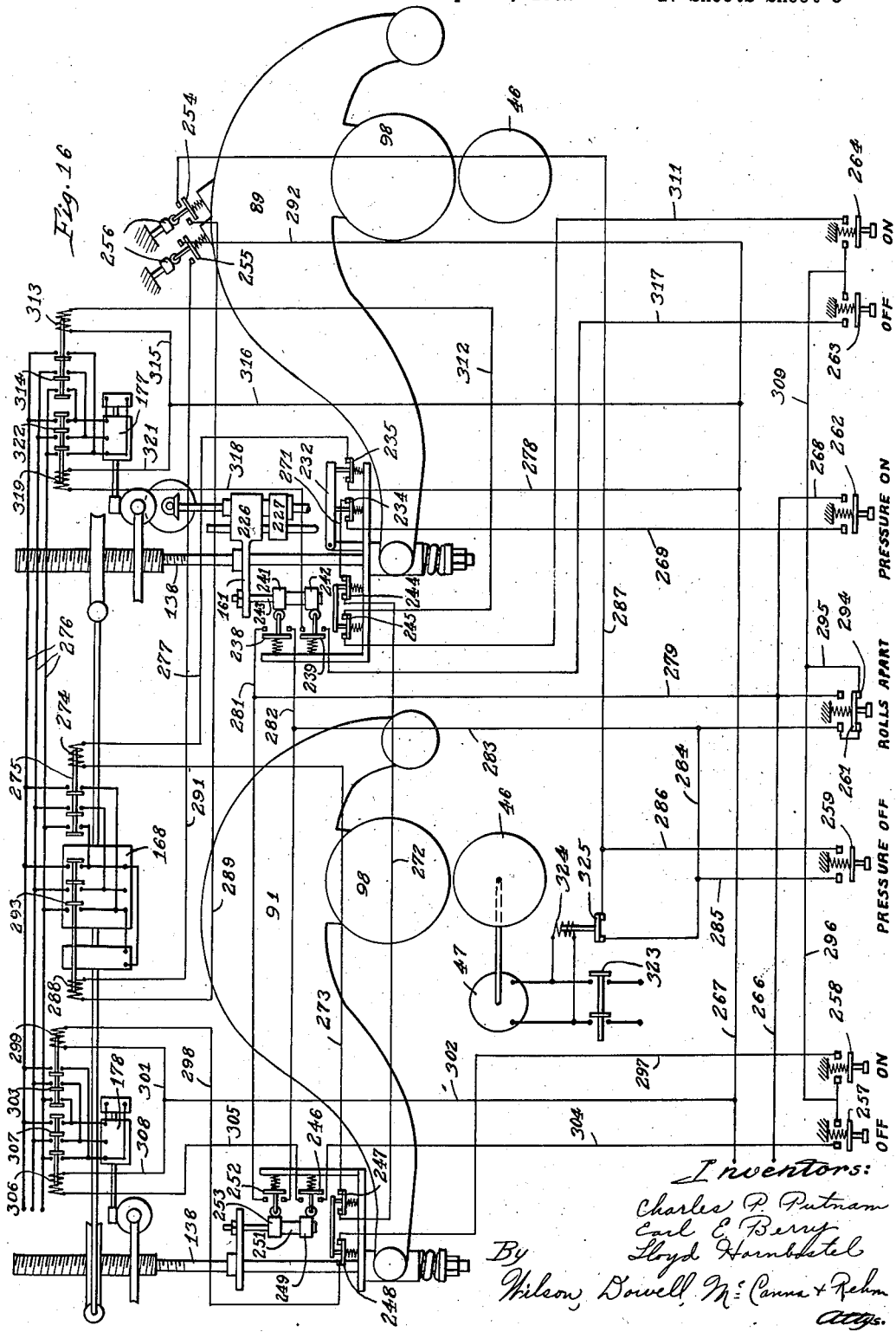

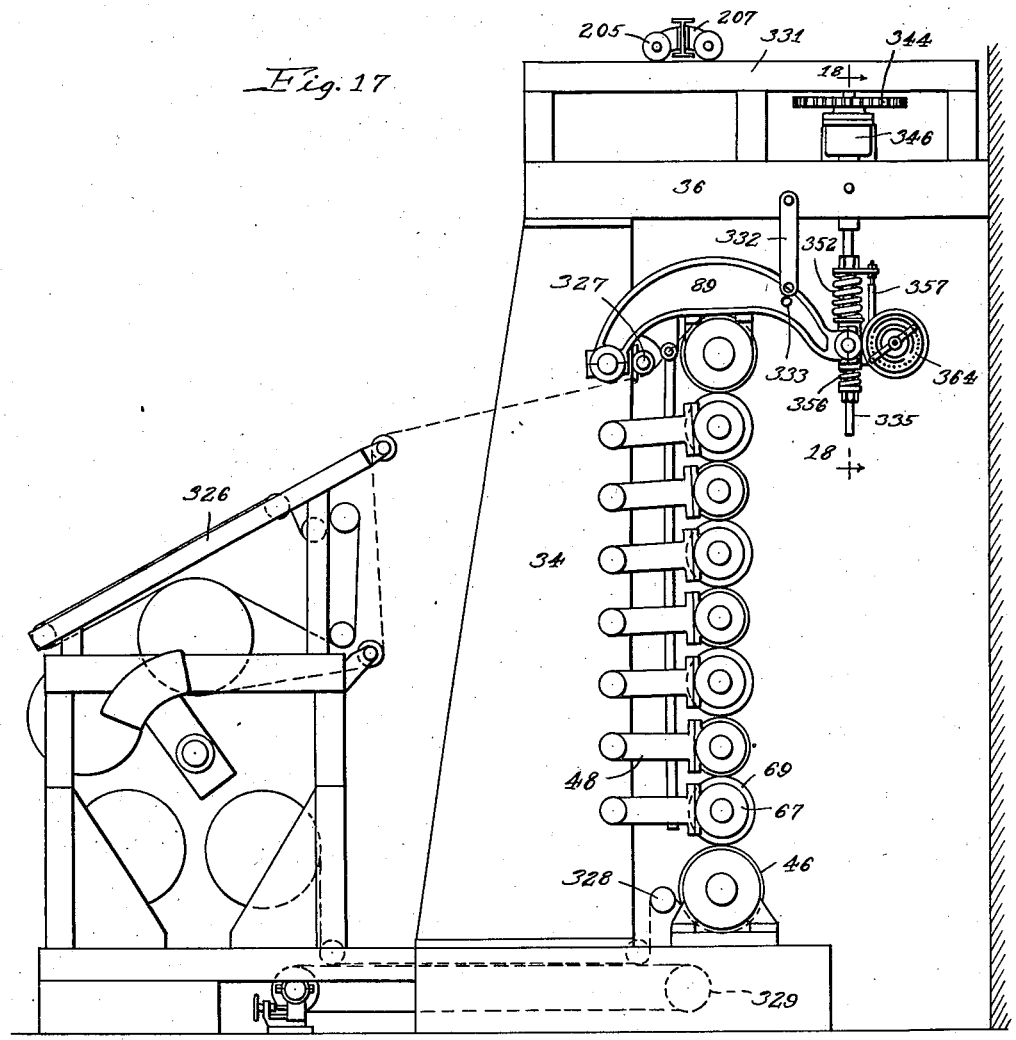

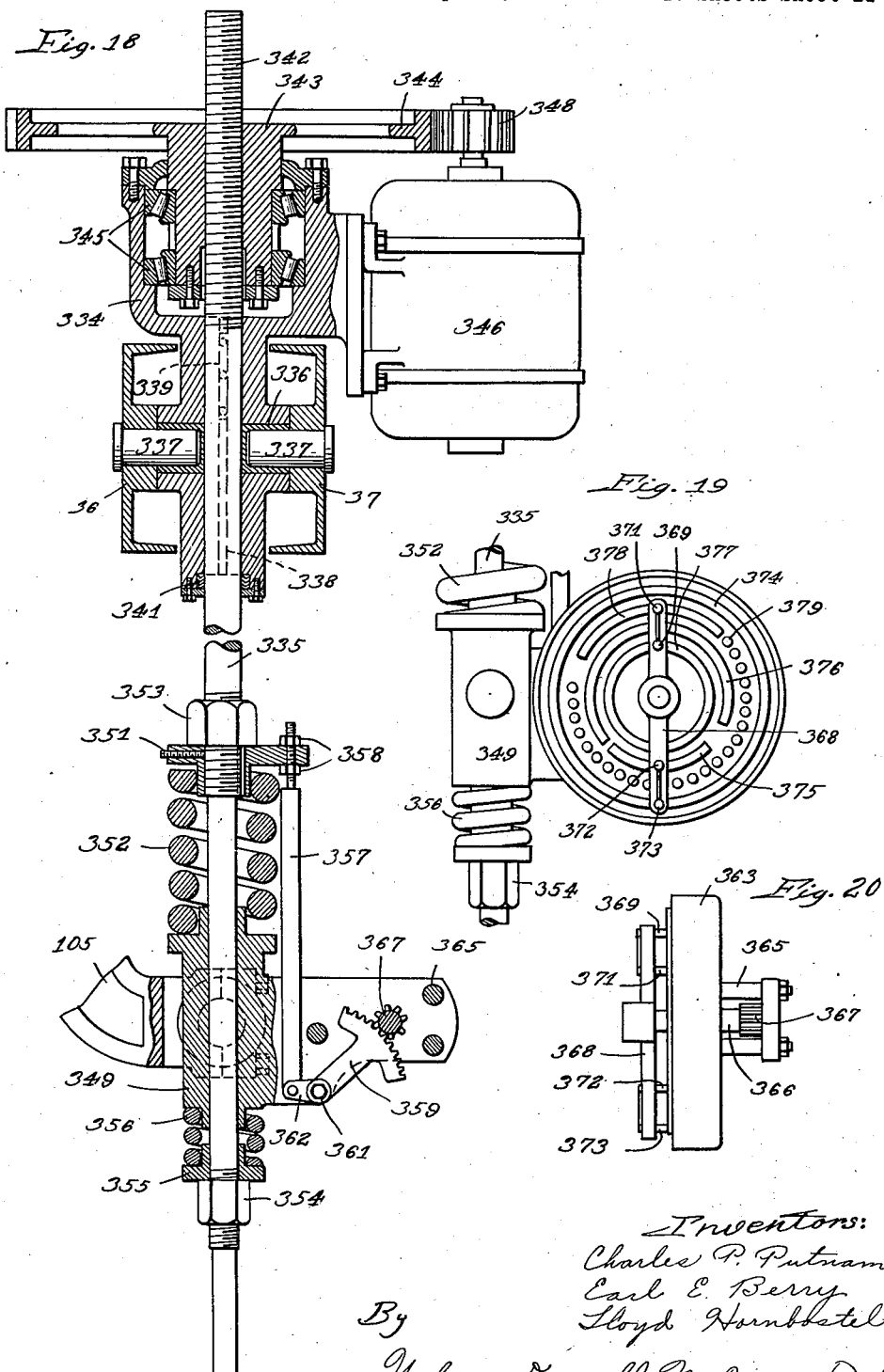

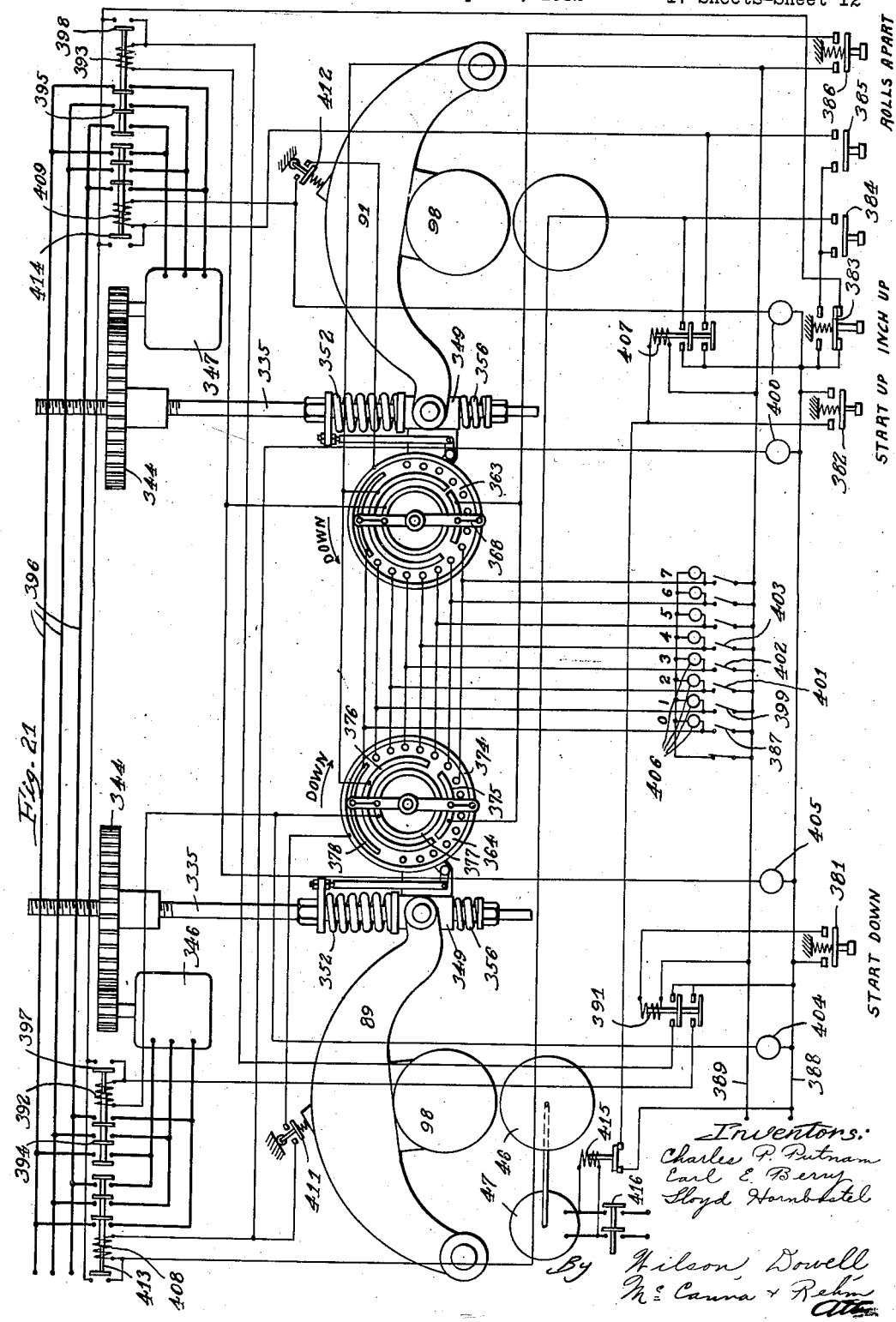

Oct. 20, 1936.    C. P. PUTNAM ET AL    2,058,352
CALENDER MACHINE
Filed Sept. 2, 1932    17 Sheets-Sheet 13
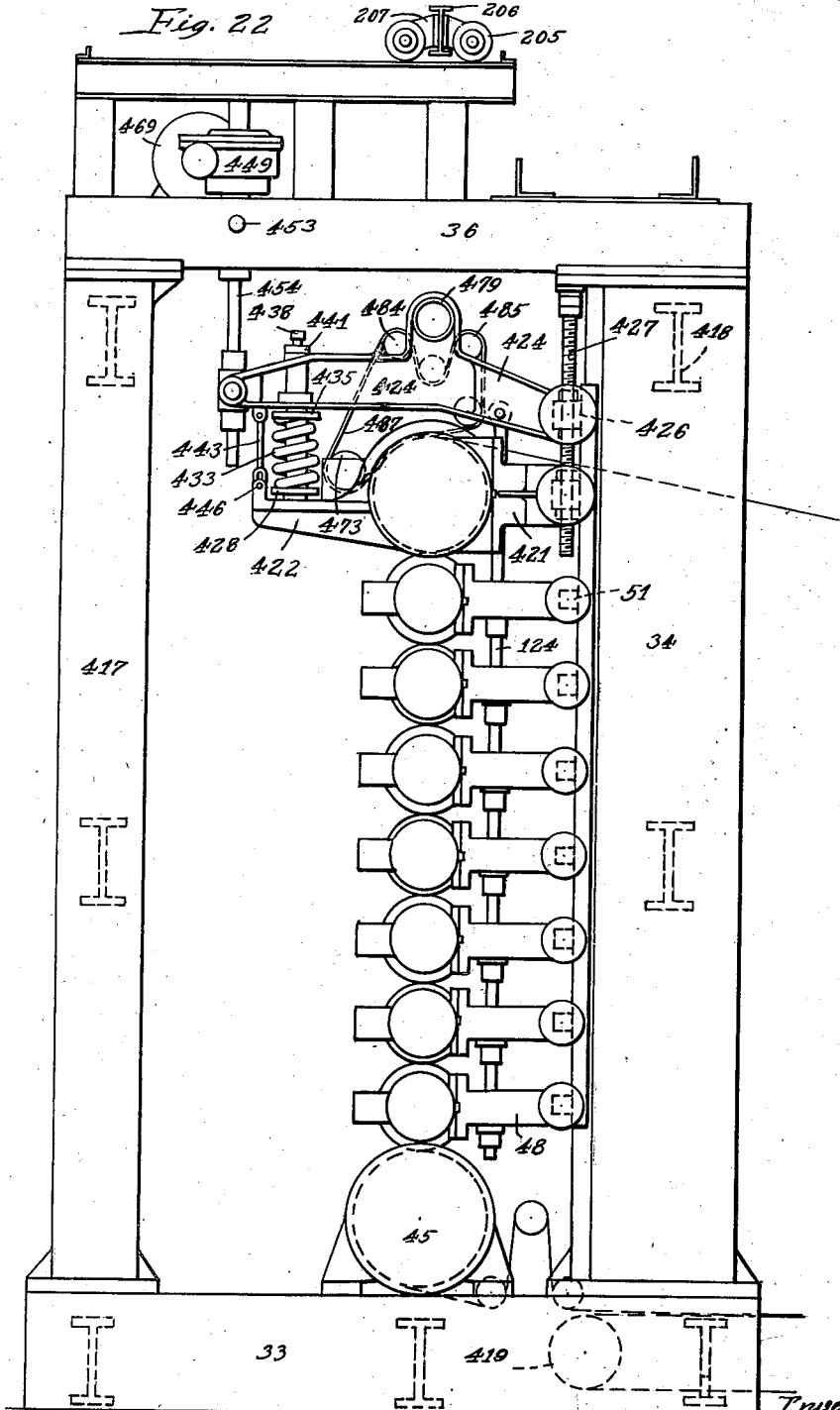

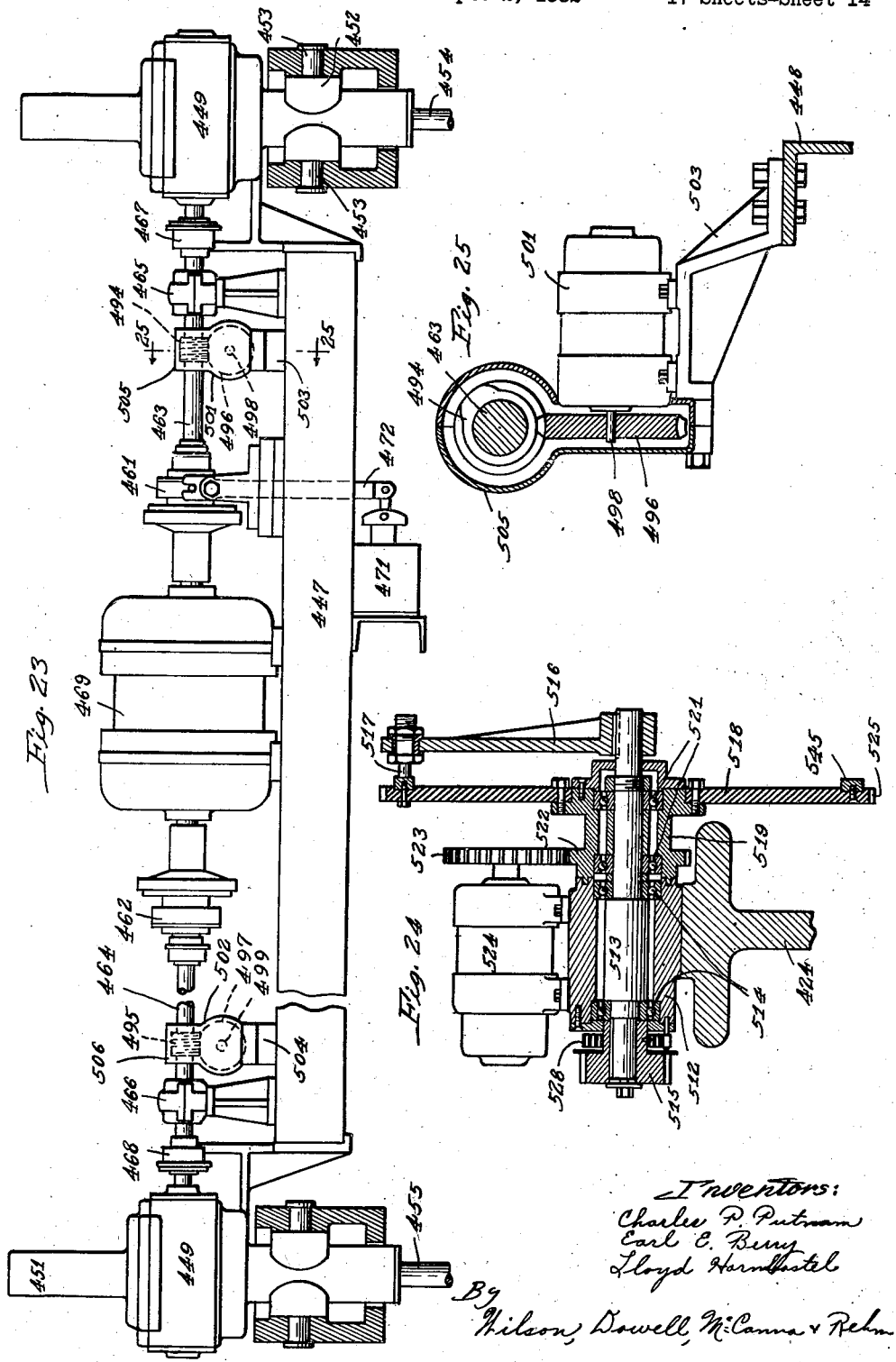

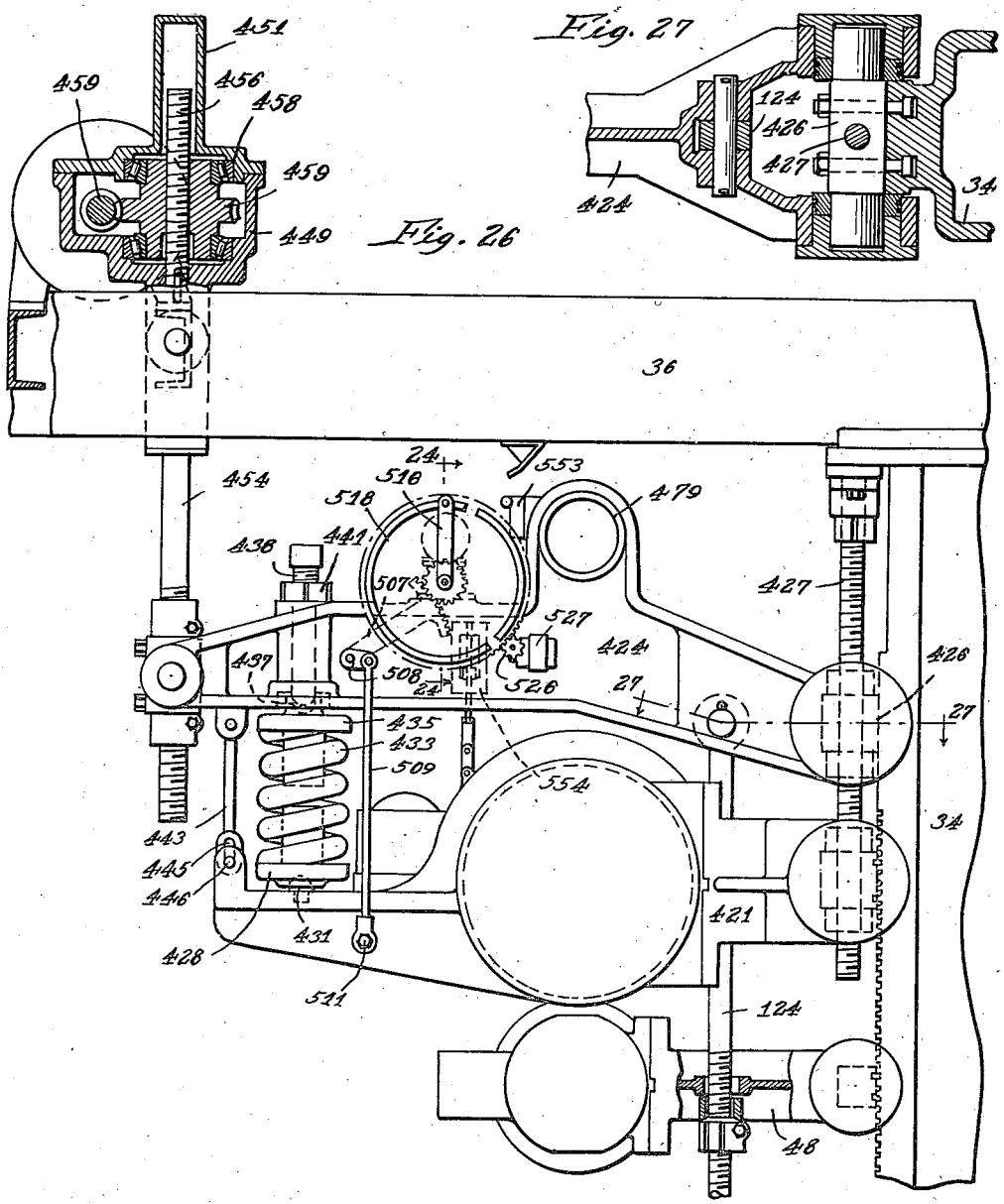

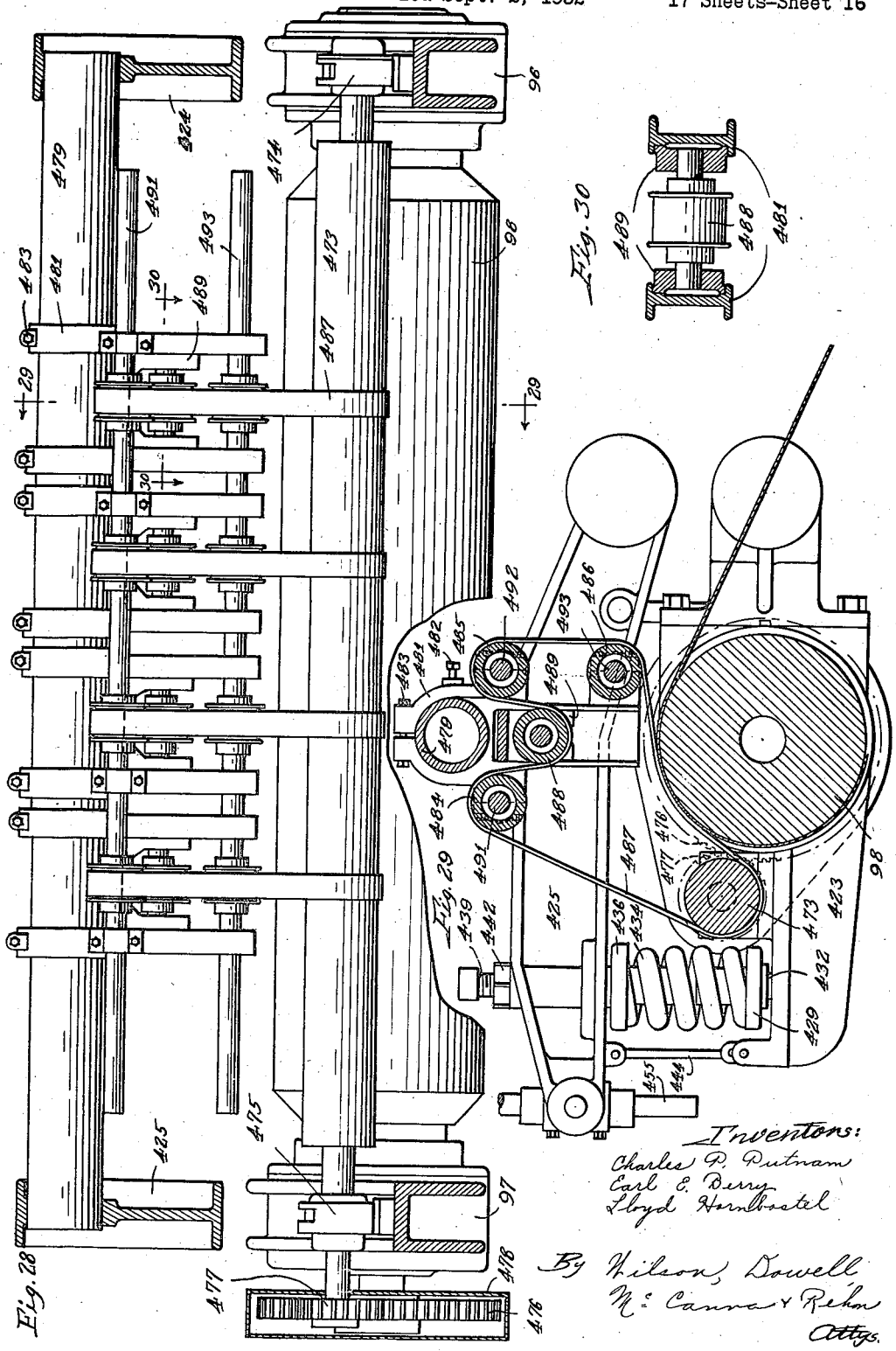

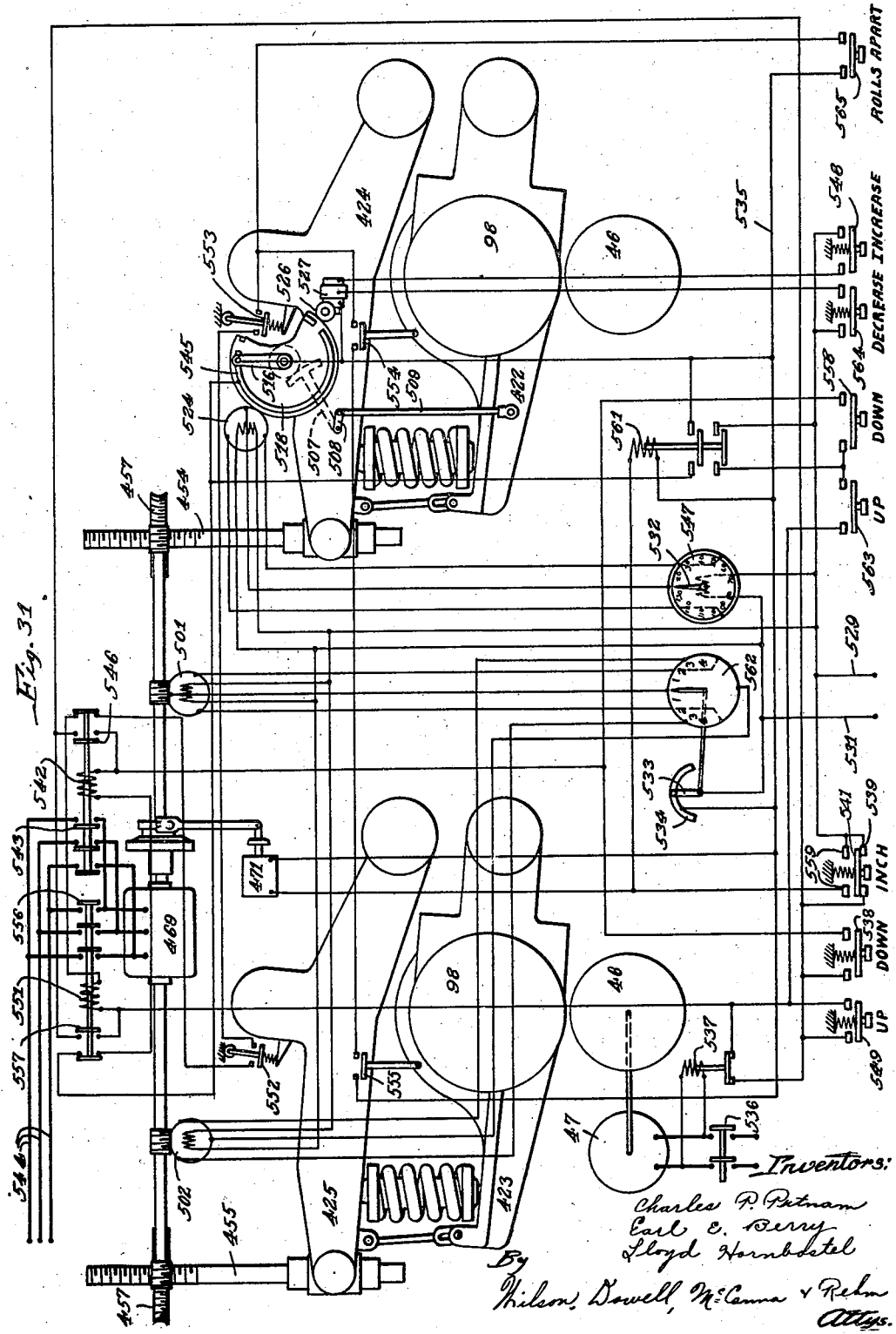

Patented Oct. 20, 1936

2,058,352

UNITED STATES PATENT OFFICE 2,058,352

CALENDER MACHINE

Charles P. Putnam, Lockhaven, Pa., and Earl E. Berry and Lloyd Hornbostel, Beloit, Wis., assignors to Beloit Iron Works, Beloit, Wis., a corporation of Wisconsin Application September 2, 1932, Serial No. 631,519½

86 Claims. (Cl. 92—73)

This invention relates to paper making machinery and has special reference to supercalenders of improved construction.

The operation of supercalenders in the past has been beset by many difficulties which were largely due to the construction of the machine. One of these difficulties was uneven calendering of the sheet across its width. This difficulty was largely the result of the position of adjacent rolls in the stack. In these machines it is necessary to maintain the rolls of the stack in exact alignment to prevent excessive pressure at any one point on the sheet. If the rolls are slightly out of alignment they develop areas of uneven pressure, at which points a larger amount of the power input into the stack is converted to heat, thereby expanding the rolls in this area, particularly the metal rolls. As a result, the expansion of the rolls is uneven, thus further increasing the localization of the calendering action, since the expanded areas of the roll tend to lift the other portions of the roll out of contact with the adjacent roll so that the calendering action in these areas is decreased. Frequently, when a new calender was first put into operation, the rolls would maintain their alignment, but after a short period of service the wear in the bearings and bearing supports and spreading of the frame gave the roll an excessive amount of movement or freedom, thereby resulting in misalignment of the rolls. Another reason for the uneven calendering of the sheet lay in the fact that a considerable amount of heat was generated in the bearings due to the high pressure on the rolls. The heat from the bearings was conducted into the rolls causing excessive expansion of the rolls at their ends. This expansion tended to leave a space between the rolls at their centers so that the center part of the sheet received little or no calendering action. Furthermore, because of this uneven action of the rolls on the sheet the sheet had a tendency to break in the calender which resulted in a decrease of output, a large loss of paper due to breakage of the sheet, and considerable damage to the rolls themselves, the broken ends of the sheet producing surface irregularities on the paper or fibre rolls which required them to be frequently reground or resurfaced. Another effect of the above mentioned roll conditions was a high power input into the machine, that is, the machine required a considerably larger amount of power for its operation than would otherwise have been necessary.

Another objection to the machines of the prior art lay in the difficulty with which the rolls were removed from their supports. In these machines the rolls were supported upon vertically slidable bearings between vertical frame members. Therefore, in the removal of at least a part of the rolls the frame had to be taken apart and the rolls removed by hand, requiring days of time for its accomplishment.

A further disadvantage of the supercalenders of the prior art lies in their limited speed. The average or usual speed for these machines is low, the average probably being in the order of about 400 R. P. M. However, for more efficient production it is necessary that the speed of these machines be materially increased, which is impossible with the machines of the prior art. The calenders of the past, because of poor roll alignment referred to, were limited in speed by the heating effect of the rolls.

It has been necessary or desirable in supercalenders to increase the pressure on the sheet as it passes through the rolls beyond that developed by the weight of the rolls alone. For this purpose, the usual practice has been to employ levers upon which weights are supported, the levers acting against the top roll bearings of the stack. It has also been suggested to employ hydraulic devices for exerting a pressure against the upper roll of the stack. However, it has been impossible to determine the actual amount of pressure applied, that is, no practical means have been devised whereby the operator may know what pressure he is applying to the sheet, nor has there been any practical way of applying different pressures to the opposite ends of the rolls. Furthermore, the weight and lever method of applying the pressure has required that the operator take his attention from the operation of the machine to manually apply the weights to the levers, the operation requiring considerable labor and also time on the part of the operator, and even then it was impossible to accurately apply the pressure due to friction in the lever systems. Furthermore, if for any reason, such as a break in the sheet, it was necessary for the pressure to be removed from the rolls, it took considerable time to do this.

No adequate means have been provided for operating or lifting the rolls to keep them out of contact when the machine is not in operation. It is necessary that these rolls be kept apart when not in operation, particularly when fiber rolls are employed, since the weight of the rolls one upon another is sufficient to cause a flattening or deformation of the surface thereof. The methods heretofore in use for accomplishing this purpose were cumbersome and required a good deal of time, during which the rolls were actually in contact.

Furthermore, with the old machines, should it become necessary to stop the machine suddenly, it was necessary to stop the machine with the pressure on the rolls, and some time elapses before the pressure can be removed, which causes flattening of the paper or fibre rolls, and damages the rolls in cases of breaks in the sheet.

In the operation of machines of this character some pieces of paper frequently stick to the roll and are carried around through opposed nips, thus causing damage to the surface of adjacent fibre or paper rolls by producing surface irregularities. However, sometimes this material is transferred to a second and third roll, thus damaging further rolls by producing such irregularities. This effect is also frequently produced by a break in the sheet with pressure still on the rolls. At the points where these surface depressions of opposed rolls come into contact the paper will, of course, be acted upon to a lesser extent than at other points along the roll, thus leaving a spot or streak in the sheet. The machines of the prior art offered no way of avoiding the production of these streaks or spots other than grinding down or otherwise treating the surface of the roll to remove the surface irregularities, which is usually an expensive and laborious operation.

Damage to the rolls is frequently caused by breaks in the sheet occurring between the unwinding mechanism and the calender stack, when this occurs the tension on the sheet is at once relieved and the sheet folds over as it enters the rolls, the operator being unable to stop the machine immediately in order to prevent this.

The principal object of our invention is, therefore, to generally improve the construction and operation of super-calenders, particularly in respect to the difficulties and short comings above mentioned.

Furthermore, we have aimed as an object to provide improved means for supporting the rolls whereby to eliminate at least a part of the uneven calendering of the sheet across its width, caused by localized heating resulting in uneven expansion of the rolls.

Another object of the invention is to provide means for bringing the surface irregularities of adjacent rolls out of coincidence, thereby reducing the tendency of such irregularities to produce streaks or marks in the sheet.

A further object of the invention is to provide means for supporting and maintaining the rolls in alignment, whereby to reduce the amount of breakage of the sheet, reduce friction and heat, and reduce the power input.

Another object of the invention is to provide super-calender mechanism capable of operating at higher speeds.

Another object is to provide novel means for controlling the application of pressure to the rolls, whereby the enormous pressures required in these machines may be controlled to a nicety.

Other objects of the invention are to provide novel and improved means for applying pressure to the calender rolls; to provide means for applying pressure to each end of the rolls independently of the other end; to provide improved means for controlling the pressure applying mechanism; to provide improved means for separating the rolls and for bringing them into contact; to provide means for preventing the rolls from being left with the pressure on when the machine stops; and to provide means for indicating the amount of pressure being applied to each end of the rolls whereby to rapidly and accurately control these functions to permit high calender speeds.

We have also aimed to provide a calender machine having improved tensioning means whereby tension is maintained on the sheet after a break occurs between the stack and the unwind mechanism whereby to give the operator sufficient time to remove the pressure from the rolls before they become damaged.

Other objects and advantages will become apparent to those skilled in the art from the following description and the accompanying drawings, in which—

Fig. 2 is a front view of a supercalender embodying one form of our invention;

Fig. 3 is a vertical section through the supercalender, shown partly in elevation;

Fig. 4 is a section through the pivotal mounting of the roll swing arms;

Fig. 5 is a section showing the connection between the roll bearing housings and the roll swing arms;

Fig. 6 is a vertical section through one of the roll swing arms;

Fig. 7 is a section substantially on the line 7—7 of Fig. 2;

Fig. 10 is a section on the line 10—10 of Fig. 8;

Fig. 11 is a view taken on the line 11—11 of Fig. 10;

Fig. 12 is a vertical section through the outer end of the pressure applying arms;

Fig. 13 is a sectional view of the open face side of a supercalender embodying our invention, showing the manner in which the rolls are removed;

Fig. 14 is a section on the line 14—14 of Fig. 10;

Fig. 15 is a section on the line 15—15 of Fig. 10;

Fig. 16 is a wiring diagram of the embodiment shown in Figures 1–15, inclusive;

Fig. 17 is a front view of a second embodiment of the invention;

Fig. 18 is a section on the line 18—18 of Fig. 17;

Fig. 19 is a face view of the pressure controlling rotary switch;

Fig. 20 is a side view of the pressure controlling rotary switch;

Fig. 21 is a wiring diagram of the embodiment shown in Figs. 17–20, inclusive;

Fig. 22 is a side perspective of a third embodiment of the invention;

Fig. 23 is an open face view of the third embodiment of the invention showing the pressure applying mechanism;

Fig. 24 is a section on the line 24—24 of Fig. 26;

Fig. 25 is a section on the line 25—25 of Fig. 23;

Fig. 26 is an end view of the upper roll and pressure applying mechanism of the third embodiment, showing one unit in section;

Fig. 27 is a section substantially on the line 27—27 of Fig. 26;

Fig. 28 is a front view of the sheet feeding and tensioning mechanism on the top roll;

Fig. 29 is a section on the line 29—29 of Fig. 28;

Fig. 30 is a section on the line 30—30 of Fig. 28, and

Fig. 31 is a wiring diagram of the third embodiment of the invention.

Figure 1:
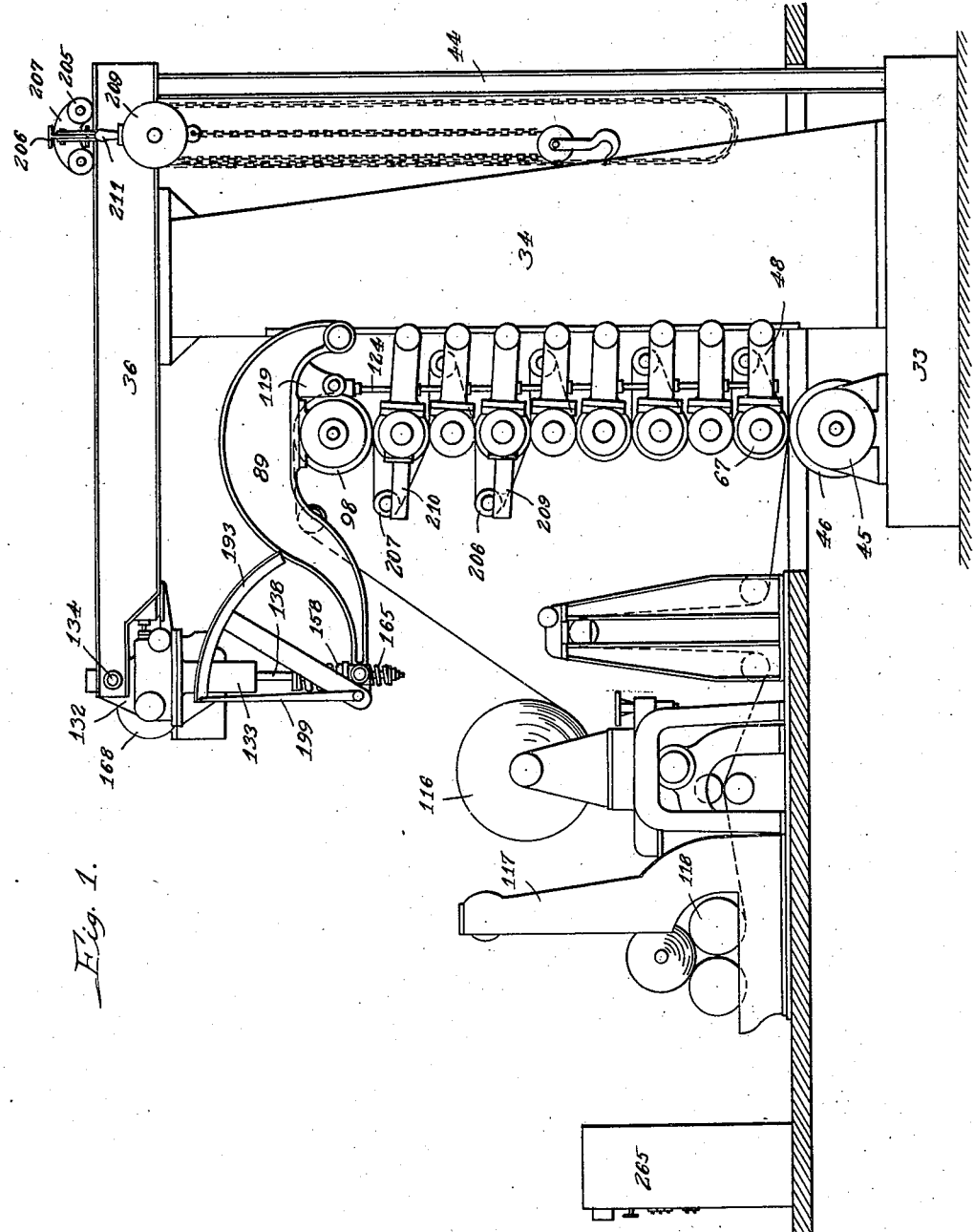
Figure 1 is a front view of a supercalender embodying our invention, shown in combination with a rewinding and unwinding mechanism.
Figure 8:
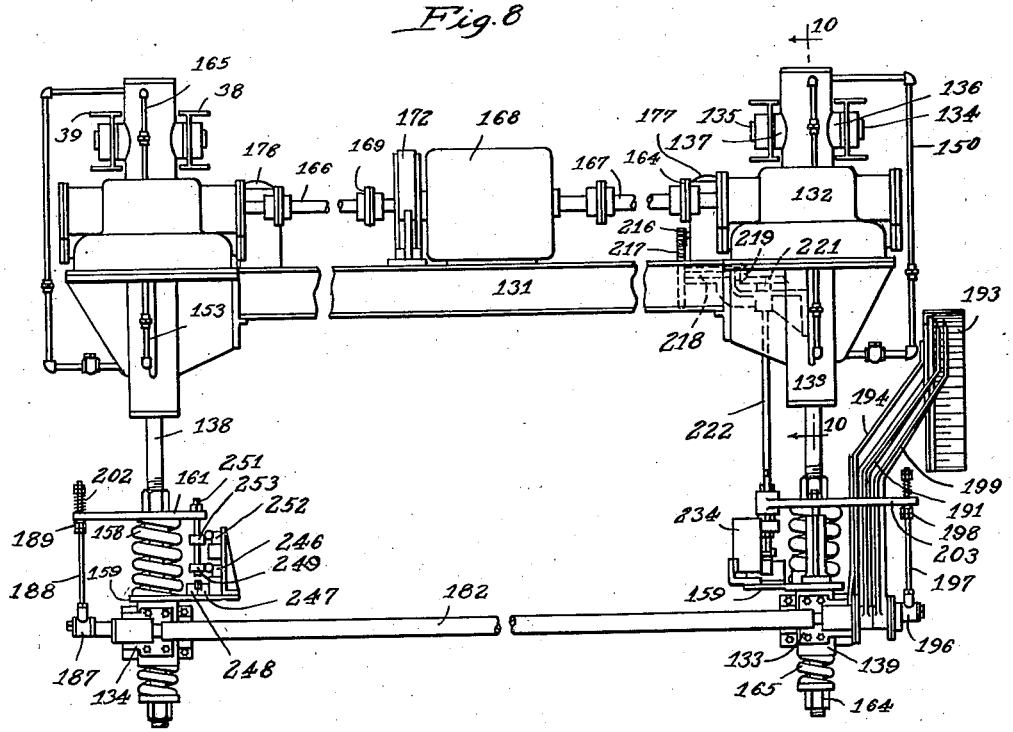
Fig. 8 is an open side view of the pressure applying mechanism.
Figure 9:
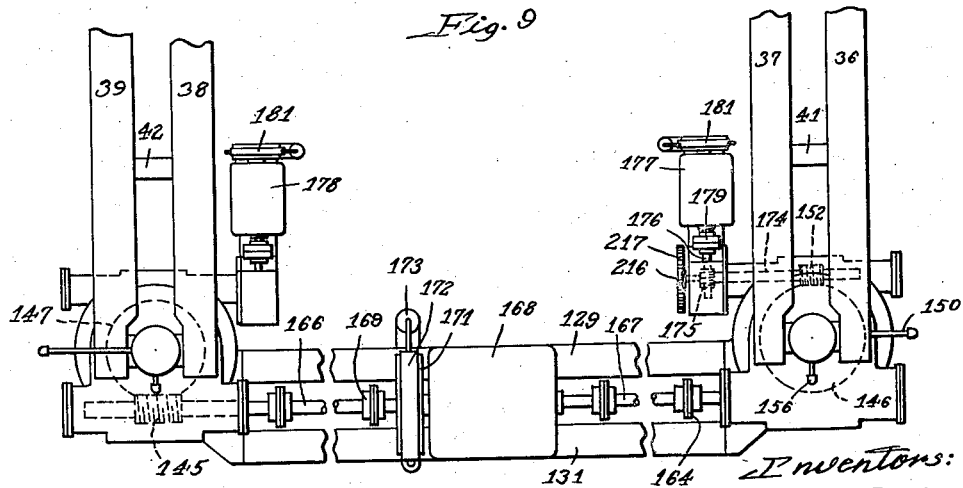
Fig. 9 is a top view of the pressure applying mechanism.

In the drawings briefly described above, we have shown three embodiments of our invention. These embodiments illustrate different species of our invention, the principles of which are explained more fully below. It should be expressly understood, however, that in applying the principles of our invention, it is not limited to the particular species herein disclosed but is applicable in its several phases in other forms and modifications. Our invention marks a distinct and important advance in this art as we have shown by its actual commercial application. We have deemed it advisable, therefore, in view of the advance made in this art and of the many new and beneficial results, to disclose a number of modifications of the invention and have accordingly presented herewith claims broadly covering the novel principles of our invention as well as claims to a number of species thereof.

In the machines herein disclosed, the operator feeds the sheet into the calender and then takes a position in front of the unwind or rewind mechanism convenient for inspection of the sheet as it is unwound and rewound in order to determine the proper treatment of the sheet. A control board is located directly adjacent to this position so that at an instant's notice the operator may selectively perform any of the operations for which the calender machine is adapted.

If, for example, a break occurs in the sheet between the unwind mechanism and the stack, the operator can instantly remove the pressure from those rolls and stop the rotation of the rolls, if desired, and because of the facility of control he can thereby prevent damage to the fibre or paper rolls of the machine. From this same position he can control the amount of pressure applied to either end of the roll in accordance with the condition of the sheet as it comes onto the rewind drum. Likewise, he is in a position to constantly observe the unwind rolls so that he may watch the splices in the sheet as they are indicated by the flags and come to the surface of the roll and, as the splice moves to the first nip of the calender he can so control the machine that the sheet will be calendered practically up to the splice before the pressure is relieved from the rolls to permit the splice to pass between them and again he may apply the pressure immediately after the splice emerges from the rolls so that a minimum amount of the sheet is wasted. Also, from the same position he can continue the rotation of the rolls until the uncalendered portion of the sheet caused by the removal of the pressure therefrom while the splice passed through the rolls appears on the rewind roll and can then conveniently stop the machine in the desired position so that this uncalendered paper can be torn out of the roll and the sheet can be respliced. From the same point by merely depressing a button he may cause the identical amount of pressure to return to the rolls after an interruption such as just described, without readjusting the mechanism in any way, the depression of the button merely initiating the application of pressure, the mechanism automatically stopping when the required amount of pressure is applied. Thus, in each operation of the machine the operator is required only to initiate the operation, the operation being automatically carried forth from that point and automatically discontinued when it has progressed to the desired extent. Furthermore, all of the operations are carried out accurately, rapidly and positively as a result of which the machine may be operated at materially higher speeds than heretofore because of the improved control over the machine.

In the embodiments herein disclosed, our invention contemplates, briefly stated, the provision of a frame on which a vertical stack of rolls is supported in a particularly advantageous manner with their axes in parallel alignment. The rolls are supported on the frame through arms which are pivoted to the frame, the rolls having bearing support in the outer or free ends of the arms so that the rolls and arms may be rotated about the pivotal support of the latter as a center. In the embodiments shown in the present application, the rolls are driven from the lower roll, though this is by no means essential to the invention and the claims are not to be construed as so limited. Means are provided for applying pressure to the upper roll. In the embodiments shown in the drawings, this means includes arms pivotally supported on the frame adapted to bear against the upper roll bearings, and resilient means for applying pressure to the outer end or other part of the arms. This mechanism is so constructed that equal amounts of pressure may be simultaneously applied to opposite ends of the upper roll or so that the pressure at the opposite ends may be independently regulated. Means are also provided for indicating to the operator the amount of pressure applied to each end of the upper roll. There are also means for controlling the application of pressure to the roll, the removal of pressure from the roll, and the lifting of the rolls out of contact with each other, these devices being operable from a remote point preferably in view of the machine, and being so arranged that the various operations may be carried out with a minimum of manual effort on the part of the operator so that his attention is not materially detracted from the operation of the machine and so that the operations may be performed or instituted at the precise time desired and controlled to a high degree of accuracy.

*Frame and roll construction*

Referring first to Figures 1-16, inclusive, wherein one embodiment of the invention is disclosed, the frame of the machine includes a base having a pair of side members 33. A pair of spaced, vertical, main columns 34 and 35 are mounted on the side members 33 and serve to support a part of the operating mechanism along their front edges. Two pairs of spaced I beams 36, 37, 38 and 39 are attached to the upper ends of the columns 34 and 35, the pairs of I beams being connected together by means of spacing blocks such as 41 and 42, to form top beams of the frame structure. The two top beams are connected at the closed side of the machine by a cross-tie 43, which thus connects the main columns and serves as a stiffening plate. A second pair of vertical columns 44 connect the side members 33 of the base with each of the top beams and serve to further stiffen the structure. The side members 33 extend outward on the open face side of the machine to support bearing housings 45 which receive the trunnions of a lower roll 46. The bearing housings 45 are fixedly secured to the base and are so arranged that the lower roll may be driven from a motor 47 or other prime mover. A plurality of roll swing arms 48 and 49 are pivotally supported along the open face edge of the main columns 34 and 35 in vertical, spaced relationship for the purpose of supporting a vertical stack of horizontally positioned intermediate rolls, the rolls having bearing support at either end in the roll swing arms 48 and 49. The roll swing arms are pivotally supported at one end on pivot pieces arranged to be secured to the open face edge of the main columns.

Novel means are provided for securing the pivot pieces to the edge of the main columns, this means being shown to the best advantage in Figs. 4 and 6. In the present embodiment, the pivot pieces consist of a rectangular block 51 having trunnions 52 and 53 at opposite ends thereof. The block is provided with spaced keyways 54 and 55. The open face edge of each of the main columns is provided with spaced vertical T-slots 56 and with a plurality of equally spaced keyways 57 extending crosswise of the T-slots on the edge of the column, the keyways 57 having a slightly different spacing than the spaced keyways 54 and 55 on the pivot pieces. To secure the pivot piece to the frame, bolts 58 have their heads positioned within the T-slots and extend outward through the pivot pieces 51. Nuts 59 permit the pivot pieces to be drawn tightly against the main column at any desired vertical position. Keys 61 are inserted in cooperating keyways of the pivot pieces and the frame to locate the pivot pieces with respect to the frame and to prevent relative movement between these two members. Viewing Fig. 6, it will be seen that the difference in spacing between the keyways on the main column and the keyways on the pivot pieces permits the latter to be positioned along the main column at closely spaced points since the pivot pieces may be moved in either direction a distance half that of the distance between the keyways 57 on the main column by inserting the key 61 in the keyway 55 instead of the keyway 54, the pivot piece being moved sufficient distance for the keyway 55 to coincide with the next keyway of the main column.

Each of the roll swing arms 48 and 49 is forked at the end which is pivoted on the main columns, to provide legs 62 and 63 pivoted on the trunnions 52 and 53 of the pivot pieces through conical roller bearings 64. If desired, ledges 65 may be provided on the inner edge of the roll swing arms for the purpose of attaching various supplementary devices commonly used on machines of this character, such as spreaders, doctors or nip-guards, these devices being employed as desired or needed. The outer or free ends of the roll swing arms are provided with abutments 66 against which are secured and supported bearing housings 67 and 68 at opposite ends of the intermediate rolls 69, 71, 72, 73, 74, 75, 76 and 77. Each of the intermediate rolls is provided with trunnions 78 and 79 on opposite ends of the rolls received in the bearing housings 67 and 68 and supported for rotation therein by roller bearings 81 and 82, one of these bearings preferably having an end thrust bearing 80. The bearing housings 67 and 68 are secured to the abutments 66 on the swing arms by means of screws 83 passing through slots 84 on the thrust bearing end and holes on the floating bearing end in the abutments. Plate 85 is positioned beneath the head of the screws to prevent their passage through the slots and give a larger area of contact with the abutment than would otherwise be the case. These slots permit the roll and bearing assembly to be shifted endwise with respect to the roll swing arms for a purpose presently to be described. The shifting of the rolls is facilitated by a bracket 86 on the bearing housing 68, that is, the housing of the end thrust bearing end, this bracket having a slot for the reception of a screw 87 arranged to pass through the bracket and into a threaded opening in the roll swing arm 49. A collar 88 on the screw prevents endwise movement of the screw with respect to the bracket so that the bracket and bearing housing are caused to follow when the screw is threaded into or out of the threaded opening in the roll swing arm. A tongue and groove connection 90 between the bearing housings and the abutments maintains alignment of the two parts. This bracket and screw facilitates the endwise movement of the roll and serves as an index of the position of the roll. Chilled iron or steel intermediate rolls do not have this adjustment, it is only on paper or fibre rolls.

A pair of pressure applying arms 89 and 91 are pivotally secured to the main columns above the vertical row of roll swing arms 48 and 49 through pivot pieces 92 identical in construction with the pivot pieces 51 and through forks 93 and 94 and cone-type bearings 95. Bearing housings 96 and 97 substantially similar to bearing housings 67 and 68 are secured to the lower side of the pressure applying arms 89 and 91 in a position to support an upper roll 98 in the same vertical plane as the intermediate rolls 69—77, the upper roll 98 being supported on trunnions 99 and 101 for rotation in roller bearings 102 and 103 similar to the roller bearings 81 and 82, respectively. The outer ends 104 and 105 of the pressure applying arms 89 and 91 are arranged to receive pressure applying mechanism presently to be described. Fly rolls 106, 107 and 108 may be rotatably positioned upon brackets 109, 110 and 111 secured to the bearing housings of the intermediate rolls and, in the case of brackets 111, to the pressure applying arms 89 and 91. Likewise, fly rolls 112, 113, 114 and 115 are rotatably supported on the roll swing arms on the closed side of the machine. The paper passing between the calender rolls is adapted to pass from a roll 116 on an unwinding and rewinding mechanism designated generally by the numeral 117 over these fly rolls, between the various nips of the calender, and be rewound on drums 118, the fly rolls and spreaders, if necessary, serving to properly spread the sheet.

Thus, the frame and roll construction is such that the calender rolls are supported in front of the main columns of the frame and are pivotally supported thereon by means of the roll swing arms so that they may swing in an arc for contact with each other in a vertical plane instead of having their bearings slidably supported for vertical movement directly in the frame, as in conventional machines. Furthermore, means are provided for accurately positioning the pivotal points of support on the frame so that the pivotal point may be centered within close limits to properly position the roll. The position of the pivotal point on the frame depends largely upon the size of the roll. While the size of the roll is normally fixed at the time of manufacture, yet a part of these intermediate rolls in this instance, namely, rolls 69, 72, 73, 75 and 77, are soft rolls usually of paper or other fibre which are easily damaged and must periodically be ground down to provide a smooth surface. By grinding the rolls down the diameter thereof is altered so that it frequently becomes necessary or advantageous to alter the position of the pivotal connection between the roll swing arms and the main column. A further innovation in construction lies in the manner of affixing the bearing housings 67 and 68 to the roll swing arms whereby the paper or fibre roll may be adjusted or shifted longitudinally. The importance of this feature becomes apparent from the fact that small pieces of paper and other material sometimes clings to the rolls and is carried around through the nip, thereby causing a depression in the surface of the fibre rolls. Sometimes this object is carried around to the next succeeding fibre roll where a depression is also formed in this roll. These two depressions are, therefore, in a position in which both will strike the sheet passing through the calender at the same point or points, thus providing an area on the sheet which does not receive the calendering action as it passes through the particular rolls in question. If, however, one of these rolls is shifted endwise the depressions on the two rolls will not occur or line up at the same point in the sheet so that the action of only one nip will be lost because of each of the depressions. This arrangement permits the paper rolls to be used for a considerably longer period of time before it becomes necessary to resurface the roll.

Roll lifting mechanism

Means are provided for rapidly separating the various rolls when the machine is not in operation so as to prevent deforming the softer or fibre rolls of the stack. This mechanism consists of brackets 119 and 121 on the lower side of the pressure applying arms 89 and 91, respectively, the brackets having ears between which are pivotally supported connectors 122 and 123. Vertical lift bars 124 and 125 extend downward from the connectors 122 and 123 through openings 126 and 127 in the roll swing arms 48 and 49, respectively. The lift bars are threaded substantially throughout their length and are provided with vertically spaced nuts 128 so positioned and shaped that upon vertical movement of the lift bars upward the nuts will come into contact with the lower side of the roll swing arms and rotate them about their pivot points so as to bring the rolls in vertical spaced relation. This position is normally called the "rolls apart" position. The nuts are so arranged on the lift bars that the rolls will be progressively separated, that is, the first roll will be separated or spaced from the second and thereafter the second will be lifted from the third, and so forth, until all of the rolls have been separated. This position is shown in Fig. 3 of the drawings. Vertical movement of the lift bars is brought about through rotation of the pressure applying arms 89 and 91. Thus, the pressure applying arms serve two separate and distinct functions. When downward movement or pressure is applied to the outer ends 104 and 105 of these arms, the upper roll 98 is forced downward against the next lower roll, causing a pressure to be exerted thereon. This pressure is transmitted through the various intermediate rolls against the lower roll 46. Thus, the intermediate rolls are compressed between the stationary lower roll 46 and the upper roll 98. The amount of pressure applied between the rolls depends upon the amount of downward pressure imparted to the pressure applying arms. The second function of the pressure applying arms is to bring about the separation of the rolls or the movement thereof to the rolls apart position. This is accomplished through rotation of the pressure applying arms upwardly from the position shown in Figure 1 to the position shown in Fig. 3, which rotation is brought about by upward movement of the outer ends 104 and 105 of the pressure applying arms. The pressure applying arms are arranged to occupy two positions; a lower position or "pressure off" position and an upper "rolls apart" position, corresponding to three positions of pressure applying plungers presently to be described, these positions being, first, an intermediate position, as shown in Figure 1, wherein the rolls rest in contact, the pressure thereon being only that due to the weight of the rolls and of the pressure applying arms, second, any of a plurality of so-called "pressure on" positions, such as shown in Fig. 2, wherein downward pressure is applied to the outer ends 104 and 105 of the pressure applying arms so that the rolls are urged together under more pressure than the weight of the rolls and arms. In these positions, the present embodiment of the invention is adapted to apply pressure in excess of the weight of the top roll, ranging up to 200 tons on the upper roll of the stack. And thirdly, a rolls apart position, such as shown in Fig. 3 wherein the outer ends of the pressure applying arms are rotated upward to separate the rolls.

Pressure applying mechanism

The pressure applying mechanism in this embodiment consists of two pressure applying units, each arranged to apply pressure to one side of the stack and acting against one of the pressure applying arms, the units being rigidly connected by means of cross-channels 129 and 131. Each of the pressure applying units includes a casing having upper and lower members 132 and 133 secured together to form a housing for the gear and screw members. The pressure applying mechanism is pivotally supported on the frame through trunnions 134 and 135 fixedly mounted on the I beams 36 and 37 and the I beams 38 and 39, respectively, of the top beams, on bearings 136 and 137. Through these pivotal connections the pressure applying mechanism may rotate as a body with respect to the frame. Each of the pressure applying units, shown best in Fig. 10, includes a pressure applying plunger 138 extending out of the casing and through a sleeve block 139 pivotally supported in the outer ends 104 and 105 of the pressure applying arms on trunnions 141 and 142. A key 143 acting between the pressure applying plunger and the sleeve block prevents rotation of the plunger in the block but permits of a certain amount of vertical movement. The upper end of the pressure applying plunger 138 is provided with external threads, as shown at 144, arranged to cooperate with internal threads in a sleeve 145 so that rotation of the sleeve will cause the plunger 138 to be moved vertically. The sleeve 145 is also provided with external threads arranged to cooperate with internal threads in the hub of a worm gear 146. A worm gear 147 is rotatably mounted on the tops of the square threads on the outside of sleeve 145 and between roller thrust bearings 150 and is arranged to drive the same through a key 148 positioned in a splined groove 149 on the outside of the sleeve. The key 148 and keyway 149 provide means whereby the sleeve may be rotated from the worm 147 but may also be free for vertical movement with respect to the worm gear 147. A worm 151 is arranged to drive the worm gear 147 and a worm 152 is arranged to drive the worm gear 146. Thus, the pressure applying plungers 138 may be moved either by the worms 151 or the worms 152, the driving ratios between the pressure applying plungers and each of the worms being different so that the plungers may be advanced at different rates of speed. In order to lubricate the worms, worm gears and other mechanism within the gear casing the latter is largely filled with oil. A pipe 150 connects chambers 154 and 157 at the bottom and top of the sleeve 145 so that as the sleeve 145 moves downward oil will be pumped from the chamber 154 through the pipe 150 into the chamber 157 at the upper end of the sleeve. The oil moves downward from this chamber under gravity back into the chambers 155 to be again recirculated upon downward movement of the sleeve. Upon upward movement of the sleeve excess oil that has not run down through the thread is driven from the chamber 157 into chamber 155 through overflow pipe 156 and is drawn into chamber 154 through pipe 153. Resilient or compressible means are provided for transmitting the longitudinal movement of the pressure applying plungers 138 to the pressure applying arms. This consists of calibrated coil springs 158 surrounding the pressure applying plungers 138 and arranged to bear against platforms 159 on the upper end of the sleeve blocks 139. A foot 161 is secured to each pressure applying plunger by means of a set screw 162 and bears against a nut 163 on the pressure applying plunger above the foot. The spring 158 is arranged to bear at its upper end against the lower side of this foot so that upon downward movement of the pressure applying plunger the foot will act against the upper end of the spring, forcing it against the platform 159 and thereby compressing the resilient member or spring and thus applying pressure to the ends of the pressure applying arms. A nut 164 is threaded onto the lower end of the pressure applying plunger and a coiled spring 165 is interposed between the nut and the lower end of the sleeve block 139 so as to transmit the upward movement of the plunger to the pressure applying arm.

The worms 151 of both of the pressure applying units are driven through shafts 166 and 167 from an electric motor 168 supported on the cross-channels 129 and 131, couplings 169 serving to facilitate alignment of the shaft. Braking means are provided for stopping rotation of the motor immediately upon the stoppage of current. This consists of a brake drum 171 mounted on the shaft 166 and a brake band 172 connected to a solenoid 173 arranged to be actuated when current ceases to flow to the motor 168 so that the brake will be applied at this point. The vernier worms 152 are mounted on shafts 174 having worm gear 175 arranged to be driven from worms on shafts 176, the shafts being driven from vernier motors 177 and 178 through couplings 179. The motors are provided with magnetic brakes 181 similar to the magnetic brake on the motor 168.

Thus, the motor 168 is arranged to simultaneously drive the pressure applying plungers of both of the pressure applying units at the same rate to simultaneously impart equal pressure to each end of the pressure applying arms while the vernier motors 177 and 178 are arranged to independently drive the pressure applying plungers at a substantially lower rate of speed so that the pressure at the two pressure applying arms may be adjusted as desired by the operator. The motor 168 is employed for applying pressure to the pressure applying arms. The vernier motors are employed for adjusting the relative amount of pressure on each of the pressure applying arms when the plungers occupy their "pressure on" position so that the pressure applied at the two ends of the rolls may be independently controlled.

A further advantage of this combination lies in the fact that once the pressures have been set they may be returned to the same pressures from the "pressure off" position by operation of the motor 168. At the outset of the operation of the machine the motor 168 may be operated to bring the pressure applying plungers to the "pressure on" position and the vernier motors may be then operated to adjust the pressure on the ends of the roll to fit the sheet being passed through the supercalenders. When, as frequently occurs in the operation of such machines, it becomes necessary to relieve the pressure on the rolls or separate them this may be done without disturbing the setting of the vernier mechanism, the rolls being brought back to the same relative pressure by the mere operation of the motor 168, so that the setting of the relative pressures at the two ends of the rolls is not disturbed by the interruption in the operation of the machine. This tends to higher production of a more uniform sheet of material and materially reduces the time required for bringing the machine back into operation.

Attention is directed to the fact that the pressure applying mechanism is supported entirely through pivotal connections with the top beams so that it may rotate about a horizontal axis. This mechanism is also connected to the pressure applying arms through the sleeve blocks 139 which are pivotally supported upon these arms. This construction permits of a fixed connection between the pressure applying mechanism and the pressure applying arms and provides an arrangement whereby the pressure may be applied to the ends of the pressure applying arm to the best advantage in all rotative positions of the pressure applying arms, the pressure applying mechanism swinging about its pivotal support with rotation of the arms. This is particularly advantageous when the rolls wear down, causing the pressure applying arms to take different positions.

*Pressure indicating mechanism*

One phase of the present invention lies in the provision of means for indicating to the operator the amount of pressure applied to each end of the rolls. This mechanism shown to best advantage in Figs. 7 and 8 consists of a shaft 182 extending across the open face side of the machine. The shaft is supported at opposite ends on the sleeve blocks 139 through bearing housings 183 and 184 and bearings 185 and 186. A crank 187 is secured to the rear end of the shaft 182 and cooperates with a rod 188 arranged to pass through an opening in the rear foot 161. Nuts 189 on the rod 188 serve as abutments against which the lower side of the foot 161 bears when the pressure applying plunger 138 is moved downward. When the foot 161 moves against the abutment 189 the rod 188 acting through the crank causes the rotation of the shaft 182. A hand 191 fixedly secured to the opposite end of the shaft 182 by means of a pin 192 rotates with rotation of the shaft 182 and indicates the pressure applied to one side of the calender rolls on a scale 193 which is supported on the bearing housing 183 by means of fingers 194. A trunnion 195 on the forward end of the shaft 182 rotatably supports a crank 196 similar in function to the crank 187 at the opposite end of the shaft 182. A rod 197 is connected to the crank and extends upward through the foot 161 of the front pressure applying unit, the rod also being provided with an abutment 198 against which the foot bears upon downward movement of the pressure applying plunger, thus bringing about rotation of the crank 196. A hand 199 is secured to the bearing housing 201 on the trunnion 195 and is rotated by movement of the crank so as to indicate against the scale 193 the pressure applied to the front end of the rolls. Springs 202 on the rods 188 and 197 serve to permit a certain amount of upward movement of the feet 161 with respect to the rods when the hands 191 and 199 come in contact with an arm 203 on the feet 161 when the rolls are raised apart, which prevent their movement backward beyond the zero point on the scale.

When the pressure applying plungers 138 are moved downward the pressure applying arms will move downward until the calender rolls come into contact with each other. During this movement of the pressure applying arms there will be relatively no vertical movement of the plungers with respect to the pressure applying arms. However, when the rolls are in contact, further downward movement of the pressure applying plungers will cause pressure to be applied to the pressure applying arms through the feet 161, the springs 158 and the sleeve blocks 139, thus causing the springs to be compressed into the pressure on positions. During this movement as the springs 158 are compressed the platforms 159 and the feet 161 will come closer together. As this occurs the cranks 187 and 196 will be rotated by contact of the feet 161 with the abutments 189 and 198 on the rods 188 and 197. The springs 158 being calibrated, this movement will be in proportion to the pressure being applied to the pressure applying arms and will be indicated on the scale 193 by the hands 191 and 199, each hand indicating the pressure on one side of the rolls. The scale 193 is placed in a convenient position and is of such size that the operator may visually observe the same and be informed of the pressure from a remote point of control presently to be described.

*Roll handling mechanism*

It occasionally is necessary to remove the rolls from the supercalender during the life thereof and in order to facilitate such removal, special means are provided. This means, best shown in Figs. 1 and 13, consists of a pair of shafts 204 extending between the two top beams on the top of the supercalender, each shaft having a pair of spaced wheels 205 at each end thereof arranged to roll on the eye beams constituting the top beams. A crossbar 206 is supported between the two shafts on bearings 207 and projects outward on the back and front ends of the machine, as shown in Fig. 13. Eyelets 208 on these ends serve to support chain falls 209 through hooks 211. Each of the chain falls is provided with a hook 212 arranged to receive pins 213. These pins are supplemental members arranged to be inserted into bores 214 in the journals of the rolls, the bearings being provided with removable plates 215 for the insertion of the pins. In order to remove the rolls from the machine, first the rolls must be in the rolls apart position; then the pins 213 are inserted in the bores 214, the bolt 83 connecting the bearing housings of the roll to the roll swing arms are removed, and the chain falls are operated to lift the roll, the roll being simultaneously swung outward away from the main columns during such movement. The roll may then be lowered through the chain falls to a dolly or other conveyance placed in front of the supercalender so that it may be transported away from the machine. A reversal of this process accomplishes the installation of a roll in the machine. Attention is directed at this point to the facility with which a roll may be removed from a supercalender embodying the present invention as compared with the machines of the prior art wherein it was necessary to disassemble a portion of the frame to remove some of the rolls. The wheels 205 permit the roll handling mechanism to be rolled back and forth along the top beam of the frame structure into an operative position directly over the rolls or an inoperative position toward the closed side of the machine.

*Control mechanism*

It is desirable to be able to bring the pressure on the rolls back to a previous setting after an interruption in the operation of the machine and to be able after each such interruption to bring it back to precisely the same point without adjustment. To accomplish this, a spur pinion 216 is attached to the end of the shaft 174 on the front side of the machine only, and meshes with a gear 217 on a shaft 218 bearinged in a bracket supported from the casing 133. Quarter turn bevel gears 219 and 221 transmit the motion of the shaft 218 to a shaft 222. A sleeve 223 is positioned on the shaft 222 for sliding contact therewith, a key 224 on the sleeve engaging a keyway 225 in the shaft to prevent relative rotation between the parts. The sleeve 223 has threaded engagement in a boss 226 on the foot 161 of the front pressure applying unit so that upon rotation of the shaft 222 the sleeve will be moved vertically in the boss. A block 227 is journaled and collared on the lower end of the sleeve 223 by means of shoulders 228. A pin 229 is threaded into the block 227 and is held in a desired position by a lock nut 231, the pin extending upward through a bore in the boss 226 and thus preventing rotation of the block 227 with respect to the foot 161 which might otherwise be induced by rotation of the sleeve 223. Thus, upon rotation of the shaft 222 the sleeve 223 will be rotated in the boss 226, causing movement of the block 227 and the pin 229 vertically with respect to the shaft 222, the direction of such movement depending upon the direction of rotation of the vernier motor 177.

A switch lever 232 is positioned on the platform 159 to rotate about a pivot point 233, the free end of the switch lever being positioned for contact with switch elements 234 and 235 and being arranged so that downward movement of the switch lever will cause the switch elements to open an electrical contact while upward movement thereof will permit the electrical contact to be closed. A spring 236 normally holds the switch lever in an upward position in which the switches are closed. These switches are interposed in a pressure control circuit presently to be more fully described, so that when the switch is opened the operation of the pressure applying mechanism is stopped. The switch lever 232 is moved to open the switches by contact of the lower end of the pin 229 against the contact lever. It will be seen that since there is a sliding contact between the shaft 222 and the sleeve 223, when the pressure applying plunger 138 of the pressure applying mechanism is moved downward by motor 168 the foot 161 will move downward, compressing the spring 158 and approaching the platform 159. When this movement has progressed to an extent determined by the position of the sleeve 223 in the boss 226 and by the pin 229 and the block 227, the lower end of the pin 229 will come into contact with the switch lever 232, causing the same to be rotated to open the switches, whereby movement of the pressure applying plunger 138 will cease. The gearing between the vernier motor 177 and the block 227 is such that when the motor operates in a direction to drive the pressure applying plunger in one direction, the block 227 is moved in the opposite direction at the same rate. Ordinarily, the position of the pin 229 in the block 227 is set at the time of manufacture or assembly of the machine so that the relationship between these two parts is normally permanent though adjustment may be made if desired. However, the relationship between the block 227 and the foot 161 is altered each time the vernier motor 177 is operated, thus changing the length of movement of the pressure applying plunger by motor 168 maintaining the same setting between the lower end of the pin 229 and the switch lever 232 and the amount of compressive force exerted on the spring 158 before the switch elements 234 and 235 will be opened. Since the shaft 222, block 227 and associated mechanism are provided only on the front end of the machine, associated with the vernier motor 177, and since each of the pressure applying plungers 138 are advanced an equal amount by operation of the main motor 168, any difference in the amount of rotation of the two vernier motors will be reflected in the positions of the pressure applying plungers and in the amount of compression in the pressure applying springs 158 when the parts reach the "pressure on" position as determined by the opening of the switches 234 and 235. The amount of advancement of the pressure applying plunger 138 on the front of the machine, and consequently the pressure on the front end of the rolls will be determined by the amount of rotation of the vernier motor 177 since operation of this motor in one direction raises the pressure applying plunger 138 and lowers the block 227, thus causing the switch lever 232 to be thrown with less movement of the foot 161. On the other hand, the difference in pressure applied to the two ends of the rolls will depend upon the difference in the rotative positions of the vernier motors 177 and 178. Therefore, the pressure applying plungers will always be moved into the same "pressure on" position by the motor 168 so long as the vernier motors 177 and 178 occupy the same position. However, should it be desired to apply more pressure to the left end of the rolls, for example, the vernier motor 178 would be operated to increase this pressure. As will presently be described, this increase in pressure must be brought about when the pressure is on the rolls. If, after this change, the pressure is removed from the rolls through the motor 168 and later again applied, the two pressure applying plungers would then return to the new position. If, on the other hand, the machine was set to apply, say, 100 tons of pressure, and the operator desired to reduce the pressure an equal amount on both sides, the vernier motors 177 and 178 would be operated in a direction to raise the pressure applying plungers 138 until the desired roll pressure was attained. If now, the pressure was removed from the rolls and later applied through the motor 168 the pressure applying plungers would return to the new position because of the change in the relative position of the block 227 and the boss 226.

A bracket 237 is arranged to support a pair of switches 238 and 239 in a position to be engaged by shoulders 241 and 242 on a rod 243 secured in the foot 161 on the front side of the machine.

The function of the switch 239 is to prevent the vernier motor 177 from being operated upwardly to such an extent that the bearings of the rolls might be damaged by the difference in positions of the two ends of the rolls. That is, when the vernier motor is operated to move the pressure applying plunger 138 on the front side in an upward direction the switch 239 will be opened by contact with the shoulder 242 before a dangerous position is reached. Switches 244 and 245 are positioned on the platform 159 in a position to be engaged by the lower end of the rod 243 and be opened if for any reason the main motor 168 or the vernier motor 177 be operated in a downward direction excessively. Switches 246, 247 and 248 on the back side of the machine are arranged to be operated by the shoulder 249 and the end of the bar 251 to prevent, in like manner, the main motor 168 from advancing the plunger excessively or the vernier motor 178 from moving the pressure applying plunger 138 excessively in either direction. The switch 238 on the front side of the machine and the switch 252 on the rear side of the machine are operated by shoulders 241 and 253 and serve to prevent operation of the vernier motors when the pressure applying plungers are in the rolls apart or the weights off position and limit upward movement of the plungers by motor 168 at the pressure off position. A pair of switches 254 and 255 located on the pressure applying arm 89 and in a rolls apart control circuit are adapted to be opened by coming in contact with stationary buttons or arms 256 on the top beam of the frame structure to stop the further elevation of the rolls.

Referring now to Fig. 16, wherein the various wiring connections are shown, the numerals 257, 258, 259, 261, 262, 263 and 264 designate various control buttons which may advantageously be mounted on a control panel 265 located at a point convenient for the operator. This control panel contains all of the controls for the machine including the control buttons for the power drive for the rolls. In other words, the control buttons are placed on the control panel normally used for controlling the drive. Each of these control buttons is so arranged that in order to maintain the contact it is necessary to hold the button against the pressure of a spring or other return means. Assume that the pressure applying plungers and arms occupy the "rolls apart" position, as shown in Fig. 16. This being the uppermost position, it is only possible to move the rolls downward toward the "pressure on" position. This is accomplished by closing the "pressure on button" or switch 262. This takes electrical energy from one of the control bus wires 266 and 267 through a lead 268 and a lead 269 to the switch 234. This switch being closed the current passes along a lead 271 to the switch 244, this switch being arranged to be opened along with switch 245 by contact of the lower end of the rod 243 to insure that pressure is not applied beyond the limit or capacity of the machine. The switch 244 is connected through a lead 272 to a switch 247 arranged to be actuated simultaneously with switch 248 by contact of the rod 251 to insure that pressure is not applied to the opposite end of the rolls beyond the capacity of the machine. The switch 247 is connected through a lead 273 to the coil 274 of a solenoid switch 275 arranged to close the contacts between the motor 168 and the bus wires 276 of the motor circuit to supply current to the motor 168 in a direction to drive the pressure applying screws downward. The solenoid switch 275, as well as the other solenoid switches mentioned in this specification, may advantageously be of the gravity opening type. The solenoid coil 274 is connected through a lead 277 to the switch 235 which is in turn connected through a lead 278 to the bus wire 267. Thus, so long as the switch 262 is maintained closed, the motor 168 will simultaneously advance both of the pressure applying plungers until the switches 234 and 235 are broken through contact of the rod 229 with the switch lever 232, this being the "pressure on" position for which the mechanism is set. However, if the operator desires to stop at the "pressure off" position, the switch 262 may be held closed until the hands 191 and 199 begin to register pressure on the dial 193. If this switch is then opened the pressure applying plungers will be stopped short of the desired "pressure on" position and may be brought back exactly to the pressure off position through operation of the switch 259. Current is supplied to this switch from the bus wire 266 through a lead 279 between the bus wire 266 and a lead 281 leading to the switch 238, which was closed during the downward movement of the pressure applying plunger whereby the shoulder 241 was caused to move away from the end of this switch permitting it to close. The current passes through the switch 238 and through leads 282, 283, 284 and 285 to one terminal of the switch 259. The other terminal of this switch is connected through leads 286 and 287 to the switch 254 on the pressure applying arm which is in turn connected to the coil of a solenoid switch 288 through a lead 289. A lead 291 connects the solenoid coil to the switch 255 on the pressure applying arm which is in turn connected through a lead 292 to the bus wire 267. It should be observed that the switches 254 and 255 are closed as soon as the pressure applying arm starts downward out of the rolls apart position so that since the pressure applying plungers now occupy a "pressure on" position these switches are closed. When the "pressure off" circuit just described is actuated, a three-pole switch 293 is closed, causing the motor 168 to operate in the opposite direction and move the pressure applying plungers upward to relieve the pressure on the rolls. This upward movement will continue until the switches 238 and 252 are broken by contact of the shoulders 241 and 253 therewith whereupon the pressure applying plungers will have reached their "pressure off" position. The switches 257 and 258 are for the purpose of controlling the vernier motor 178. Because of the fact that the switches 238 and 252 are open when the pressure applying arms occupy their "pressure off" and their "rolls apart" position it is impossible to operate the vernier motors from these positions. In other words, the pressure applying plungers must occupy their "pressure on" positions before either of the vernier motors may be operated. With the pressure applying plungers occupying their "pressure on" position, suppose that it is desired to increase the pressure on the rear end of the rolls. Under these circumstances, the operator will depress the button 258 and current will flow from the bus wire 266 through the leads 279 and 281, the switch 238, the leads 282 and 283 to the switch 261. In this switch, it will pass through a second pair of contacts 294 which are normally made in this switch through leads 295 and 296 to one pole of the switch 258. From the other pole of this switch it passes along a lead 297 to the switch 248 and thence through a lead 298 to the coil of a solenoid switch 299 and thence through leads 301 and 302 back to the bus wire 267. The current passing through the solenoid switch 299 closes the switch elements 303 causing the vernier motor 178 to operate and advance the pressure applying plunger to apply additional pressure to the rear ends of the rolls. On the other hand, should it be desired to reduce the pressure on the rear ends of the rolls, the switch 257 is depressed, whereupon current will flow from the bus wire 266 through the leads 279 and 281, the switch 238, the leads 282 and 283, the switch 261 and the leads 295 and 296 through the switch 257 and through the lead 304 to the switch 246 and thence by the lead 305 to the coil of a solenoid switch 306 which closes the terminals 307 through the vernier motor 178, driving the vernier motor in the opposite direction, the current passing to the bus wire 267 by way of the leads 308 and 302.

In the same way, the vernier motor 177 is controlled from the switches 263 and 264 so that when the switch 264 is depressed, current passes from the bus wire 266 through the leads 279 and 281, the switch 238, the leads 282 and 283, the switch 261, the lead 295 and a lead 309 to one terminal of the switch 264 and thence by way of a lead 311 through the switch 245, a lead 312 through the coil of a solenoid switch 313 closing the terminals 314 to the vernier motor 177, causing the motor to run in a direction to advance the pressure applying plunger on the front end of the machine. The current passes from the switch 313 through leads 315 and 316 to the bus wire 267, the operation of the motor 177 causing additional pressure to be applied to the front end of the rolls. To reduce the pressure on the front end of the rolls manually controlled switch 263 is depressed whereby current flows from the bus wire 266 through the leads 279, 281, the switch 238, the leads 282 and 283, the switch 261 and the leads 295 and 309 to one side of the switch 263. The other terminal of the switch 263 is connected through a lead 317 to the switch 239 and from therethrough a lead 318 to the coil of a solenoid switch 319 and thence by way of the leads 321 and 316 to the bus wire 267, the solenoid switch closing the terminals 322 causing the vernier motor 177 to operate in the opposite direction to decrease the pressure on the front side of the rolls.

In order to insure that the rotation of the rolls shall not be stopped while the pressure is on, means are provided for releasing the pressure on the rolls when the roll driving mechanism is switched off. The motor 47 is shown diagrammatically as driving the lower roll 46 of the calender stack, a switch 323 in the motor control circuit shown diagrammatically controlling the supply of electrical energy to the motor. The coil 324 of a solenoid switch 325 is connected across the control of the circuit of the motor 47, the connection being such that when energy is being supplied to the motor, the switch 325 will be held open and the switch will close when the switch 323 is open to shut off the supply of energy to the driving motor. Thus, when the switch 325 is closed with the pressure on the rolls, energy will flow from the bus wire 266 through the switch 238 and the switch 252 through the switch 325, the switches 254 and 255, and through the solenoid switch 288, closing the terminals 293 and causing the operation of the motor 168 in a direction such that the pressure applying plungers will be moved upward, releasing the pressure on the pressure applying arms to the "pressure off" position. The operation of the motor 168 will be stopped when the switches 238 and 252 are both opened, breaking the pressure off circuit.

The pressure applying arms may be moved into the rolls apart position only from the pressure off position and only when the rolls are not in rotation, that is, only when the switch 323 is opened and the switch 325 is closed. Under these circumstances, depression of the switch 261 causes current to flow from the bus wire 266 through the switch 261, the switch 325, the switches 254 and 255, and the solenoid switch 288, thereby closing the terminals 293 and causing the motor to rotate in a direction to lift the pressure applying arms, thereby separating the rolls. This movement will stop when the rolls apart circuit is broken by contact of the switches 254 and 255 with the top beam of the frame.

Second form of machine

In Figs. 17-21, inclusive, a second form of the invention is shown where the frame rolls and roll supporting mechanism are substantially the same as that shown in Figures 1-16, inclusive. In this embodiment the sheet is adapted to be conducted from an unwinding and rewinding mechanism designated generally by the numeral 326 to the top of the calender stack, through the stack and back to the rewind mechanism from the bottom of the stack, suitable paper carrying rolls such as 327 and 328 being provided for guiding the sheet. In this instance, a tape feed mechanism 329 is provided at the bottom of the stack for feeding the sheet under the stack frame. The frame is also provided with a frame structure 331 at the top of the stack for supporting the roll handling mechanism, this mechanism being substantially similar to that already described. In this form, links 332 are provided on the top beams and openings 333 in the pressure applying arms so that a pin may be inserted through the links and the pressure applying arms to hold the rolls in the rolls apart position in case it becomes necessary to remove the pressure applying mechanism.

Pressure applying mechanism—Second form

In this instance, the pressure applying mechanism consists of two pressure applying units independently supported between the eye beams of each top beam. Each of the units consists of a housing 334 arranged to support a pressure applying plunger 335 and having bearings 336 arranged to receive pivot pins 337 on the top beams for rotatably supporting the housing. A keyway 338 in the housing 334 receives a key 339 on the pressure applying plunger to prevent rotation of the plunger with respect to the housing. A packing gland 341 prevents the passage of lubricant downward along the plunger. Threads 342 are provided on the upper end of the pressure applying plunger and cooperate with internal threads in the hub 343 of a gear 344, the hub extending into the casing 334 and being supported therein on conical roller bearings 345. This arrangement is such that upon rotation of the gear 344 the plunger will be caused to move vertically. Motors 346 and 347 are affixed to the housings 334 and the shafts thereof are provided with spur gears 348 meshing with the gears 344 in order to drive the same. The pressure applying plungers 335 are slidably positioned in rotatable sleeve blocks 349 positioned on the ends 104 and 105 of the pressure applying arms. Feet 351 are affixed to the pressure applying plungers 335 above the sleeve blocks 349 and in spaced relation thereto, calibrated coil springs 352 being interposed between these two members. Nuts 353 on the plungers are arranged to take the thrust from the feet 351. Nuts 354 on the pressure applying plungers below the sleeve blocks 349 support collars 355 thereon, springs 356 being interposed between the collars and the bottoms of the sleeve blocks.

Upon rotation of the motors 346 and 347 in one direction, the pressure applying plungers 335 are moved downward, moving the feet 351 against the springs 352 which transmit the pressure to the bearing blocks 349 and thence to the pressure applying arms. On the other hand, rotation of the motors in the opposite direction moves the pressure applying plungers upward whereat the motion is transmitted through the collars 355 and the springs 356 and through the bearing blocks to the pressure applying arms, whereby the rolls are separated.

Control mechanism—Second form

To control the operation, the second form of machine is provided with a rod 357 fixed at one end in the foot 351 by means of nuts 358 and extends downward parallel with the pressure applying plungers 335. A gear segment 359 is rotatably supported upon a pin 361 fixed in an extended section of sleeve blocks 349, as best shown in Fig. 18. An arm 362 is integral with the segment 359 and is pivotally connected with the end of the rod 357 so that relative movement between the feet 351 and the pressure applying arms will be accompanied by rotation of the gear segment 359. Rotary switches 363 and 364 are fixedly connected to the sleeve blocks 349 by means of bolts 365, as shown in Fig. 20, each supporting a shaft 366 having a gear 367 positioned to cooperate with the segment 359 and be rotated thereby. Contact arms 368 are mounted on the shafts 366 and carry contact points 369, 371, 372, and 373, each arranged to sweep along a circle of different radius. The rotary switches are provided on their face with a plurality of contact strips and points. A contact strip 374 presents a continuous circular surface for contact of the point 373 on the contact bar. Contact strips 375 and 376 lie on the same circle to provide two separate contact strips for contact with the contact point 372. A circular contact strip 377 is arranged to make continuous contact with the point 371 on the bar. A contact strip 378 extends a portion of the distance along the circle inscribed by the contact point 369, the remainder of this circle being made up by a plurality of insulated contact points 379.

Referring now to Fig. 21, wherein the control mechanism for the second form of machine is shown diagrammatically, the manually operated switches are designated by the numerals 381, 382, 383, 384, 385 and 386, and are adapted to be positioned upon a control board such as 265 located in a position convenient for the operator of the machine. Assuming that the pressure applying arms occupy the rolls apart position, as shown in Fig. 21, the only movement of which these arms are capable is a downward movement into either the "pressure off" or the "pressure on" position. This downward movement is controlled through operation of the switch 381. Assuming that the operator desires to bring the pressure applying arms to the "pressure off" position, a manually controlled switch 387 is closed. The switch 381 is then momentarily closed, whereupon current from the control circuit bus wires 388 and 389 will flow through the coil of a solenoid operated switch 391, closing this switch. When this switch closes, current will flow from the bus wire 388 through the switch 391 and through the coils of solenoid operated switches 392 and 393, causing the terminals 394 and 395 of the motors 346 and 347 to be closed, whereby current will flow from the wires 396 to cause the motors to rotate in a direction to drive the pressure applying plungers downward. Simultaneously with the closing of the switches 392 and 393, switches 397 and 398 will be closed, whereby current will flow from the bus wire 388 through the switches 397 and 398 to the contact strips 377 of the rotary switches 363 and 364 and thence by way of the contact 369 and the contact strip 378 back to the bus wire 389. The motors will continue to operate, therefore, after the switch 381 is released until the contact points 369 move off the contact strip 378, whereupon the so-called holding circuit through the contact points 397 and 398 will be broken, thus allowing the solenoid switches 392 and 393 to open. This brings the pressure applying arms to the "pressure off" position. However, if it is desired to bring the pressure applying plungers to a "pressure on" position, switches 399, 401, etc., may be closed, the number of these switches depending upon the amount of pressure desired to be applied to the rolls. It will be seen that under these circumstances the contact points 379 on the rotary switches are connected to the bus wire 389 through the closed switches so that the contact point 369, instead of breaking the circuit as it moves off from the contact strip 378 continues to move along the contact points 379 until the circuit is broken, which will depend upon the number of switches of the series 387, 399, 401, etc., which are in the closed position. If, for example, the switches 399 and 401 are closed, the contact point 369 will move until it reaches the third button on each of the rotary switches 363 and 364. At this point, the circuit will be open, due to the fact that the switch 402 has not been closed. Therefore, at this point, the downward movement of the pressure applying plungers will stop, the switches 399, etc., thus determining the amount of pressure which will be applied to the rolls. However, should it become desirable to increase the pressure the next succeeding switch 403 may be closed and the switch 381 again depressed, whereupon the motors will operate until the contact 369 moves onto the next open contact point on the rotary switches.

Low resistance electric light bulbs 404 and 405 are connected between the bus wires 388 and the leads between the solenoid switches 392 and 393 and the inner contact strips 377 of each of the rotary switches 363 and 364 so that when the switches 387, 399, etc., are closed, these bulbs 404 and 405 will light; likewise, high resistance bulbs 406 are connected from the bus wire 389 to the lead connecting to the switches 387, 399, etc., with the contact points 379 of each of the rotary switches so that when the contact point 369 moves onto the button beyond that for which the switch on the control board is closed a second circuit will be established through the bulb 406, the button upon which the contact 369 rests and the bulbs 404 and 405 to the bus wire 388, whereby one of the light bulbs 406 will light to indicate the position of the contact point 369. At this point, the contact point 369 will rest upon one of the contact points 379 of which the switch on the control board is opened so that no current will flow through the switch, thereby causing whatever current reaches the low resistance bulbs 404 and 405 to pass through the high resistance bulbs 406, the difference in resistance being such that the bulb 406 will be lighted while the bulbs 404 and 405 will not.

Lights 400 are so connected that they are always lighted when pressure is on the stack.

The switch 382 is closed to cause the pressure applying plungers to move from a "pressure on" position to a "pressure off" position. When this switch is closed, a current flows through the solenoid operated switch 407, closing the circuit through the solenoid operated switches 408 and 409, rolls apart limit switches 411 and 412 located on the pressure applying arms, the outer contact strips 374 of the rotary switches, the contact points 373, the contact points 372, and the contact strips 376 of the rotary switches. The motors will then operate to move the pressure applying plungers to the "pressure off" position at which time the contact points 372 of the contact arms 368 move off from the contact strips 376 of the rotary switches to break the circuit. In this circuit also holding switches 413 and 414 operate to hold the solenoid control switches 408 and 409 closed after switch 282 is opened.

In order to move the pressure applying arms from the "pressure off" position to the "rolls apart" position, the switch 386 and 382 are closed, closing a circuit through the contact strips 375 of the rotary switches, the contact points 372 and 373, the contact strips 374, the limit switches 411 and 412, the solenoid operated switches 408 and 409, the solenoid operated switch 407, whereupon the motors will move the pressure applying arms upward until the limit switches 411 and 412 break the circuit.

Inching switches 383, 384 and 385 are provided for relieving the pressure on both ends of the rolls or on either end of the rolls, as desired, through a relatively small amount. If it is desired to relieve the pressure from the left end of the rolls, facing Fig. 21, the manually operated switches 383 and 384 are depressed, closing a circuit through the switches 383 and 384, the solenoid operated switch 408, the limit switch 411, the contact strip 374 of the rotary switch 364 at the rear of the rolls, the contact points 373 and 372, and the contact strip 376 of the rotary switch 364 whereupon the left hand motor will operate until one of the manually operated switches 383 or 384 are broken. On depression of the manually controlled switches 383 and 385, the right hand side of the machine will be caused to operate in the same manner, thus relieving a small amount of pressure from the right hand end of the rolls. If it is desired to inch up both pressure applying plungers the switches 383, 384 and 385 are depressed.

In order to cause the pressure applying plungers to move from the "pressure on" to the "pressure off" position whenever the rolls cease to be driven, the leads of the control circuit of the driving motor 47 are connected to the coil of a solenoid operated switch 415 so that whenever the circuit to the driving motor is opened by opening the control circuit switch 416 or otherwise, the switch 415 will close, thus closing a circuit between the bus wire 388 and the solenoid operated switch 407, whereby the control circuit through the solenoid operated switches 408 and 409 is closed, thereby causing the pressure applying plungers to be moved to the "pressure off" position.

Third embodiment

A third embodiment of the invention is shown in Figs 22-31, inclusive. In this form, the frame is substantially similar to that of the first form with the exception that a second pair of vertical columns 417 extend between the base and the top beams and a plurality of tie pieces 418 extend crosswise of the machine connecting the two main columns and the two supplementary columns 417. In this instance, a tape feed, designated generally by 419, is also provided for leading the sheet out of the bottom of the calender stack. The intermediate rolls are supported in the same manner as described under the first form. The top roll, however, is connected directly to the main columns by means of roll swing arms 421 of greater strength than the intermediate roll swing arms. Brackets 422 and 423 project outward from each of the roll swing arms 421 through which the pressure is arranged to be applied to the rolls. In this form, the pressure applying arms 424 and 425 do not support the upper roll, as in the case of the first and second machines, but they are supported on the main columns of the frame through pivot pieces 426 substantially similar to the pivot pieces 87 and 88 of the first form. However, in order to lend additional strength to the support for the roll swing arms 421 and the pressure applying arms, rods 427 extend from the top beam downward to support the pivot pieces of these elements.

Pressure applying mechanism

Spring seats 428 and 429 rest upon buttons 431 and 432 positioned in the swing arm brackets 422 and 423. Pressure applying springs 433 and 434 rest upon the spring seats and receive at their upper end spring caps 435 and 436, each of which is provided with a socket 437 for reception of the end of adjusting screws 438 and 439 positioned in the pressure applying arms 424 and 425. Lock nuts 441 and 442 on the adjusting screws are provided for securing them in a desired position. Thus, when the pressure applying arms 424 and 425 are rotated downward the ends of the screws 438 and 439 will bear against the caps 435 and 436 compressing the springs 433 and 434, thereby exerting a pressure against the swing arm brackets and the rolls. Links 443 and 444 act between the pressure applying arms 424 and 425 and the brackets 422 and 423 and are provided at their lower end with slots 445 for receiving pins 446 on the swing arm brackets so that a certain amount of movement is permitted between the pressure applying arms and the upper roll when the pressure is applied to the latter, but whereby upward movement of the pressure applying arms will cause the upper roll to be lifted or rotated about its pivotal support when the pressure applying arms move into their "rolls apart" position.

The pressure applying mechanism consists of two pressure applying units located adjacent to opposite ends of the machine rigidly connected by means of cross-members 447 and 448. The pressure applying units consist of housing members 449 and 451 rigidly connected together, the lower housing members 449 having bearings 452 for the reception of bearing pins 453 supported in the I-beams of the frame structure top beams. Pressure applying plungers 454 and 455 project out of the housings and are each provided with a threaded portion 456 within the housings arranged to receive the internally threaded hubs of worm gears 457 supported on cone-type roller bearings 458. The worm gears 457 are adapted to be driven by worms 459, which are connected to spring tensioned clutches 461 and 462 by means of shafts 463 and 464 supported in the bearings 465 and 466 and having flexible coupling members 467 and 468. The clutches 461 and 462 are driven from a motor 469 supported upon the cross-members 447 and 448. In the form shown in the drawings, a solenoid 471 is arranged to release the clutch 461 through connecting mechanism 472 responsive to the control mechanism presently to be described, but if desired both of the clutches 461 and 462 may be solenoid operated so that both sides of the stack may be inched up or down. The clutch 462 acts principally as a safety mechanism being loaded to slip when excessive torque is applied to protect the motor and pressure applying mechanism in case something goes wrong in the pressure applying control mechanism. The clutch 461 acts in the same manner as 462 if something should go wrong with the control mechanism.

Tensioning mechanism

Figs. 28 and 29 show tensioning mechanism for imparting a tension to the sheet as it enters the first nip of the calender. In the prior art, it has been customary to provide a brake for retarding the rotation of the unwind roll 116 so as to impart a tension to the sheet as it unwinds from this roll and enters the first nip of the calender. However, with this construction it was necessary for the operator to periodically adjust this brake to regulate the tension on the sheet as the diameter of the roll decreased. Furthermore, should there be a weak area in the sheet a break would be apt to occur between the unwind roll and the calender, because of the long draw and the tension on the sheet. Thus, this construction tended to increase the number of breaks.

In addition, when the sheet did break, the tension was immediately released from the tail end of the sheet entering the calender and this end would then tend to fold as it entered the calender, thereby making the soft rolls.

Improved means are herein provided for maintaining a tension on the sheet as it enters the upper nip of the calender rolls, and consists of a tensioning roll 473 supported at opposite ends on the roll swing arm brackets 422 and 423 through bearings 474 and 475. This roll is driven through a gear 476 on the end of the upper calender roll and a gear 477 on the end of the tensioning roll, the gears being surrounded by a gear casing 478. A cross-member 479 extends between the pressure applying arms 424 and 425 and serves to support a plurality of pulley brackets, designated generally by the numeral 481. Set screws 482 serve to hold cross-member 479 to the pressure applying arms 424 and 425, and bolts 483 serve to secure the pulley brackets in a desired position on the cross-member 479. Pulleys 484, 485, and 486 are mounted on shafts that are in turn supported on the pulley brackets, for rotation to receive narrow belts 487, the tensioning roll 473 and the pulleys 486 being so positioned that in passing between these two members the belt must bear against the sheet on the top calender roll. In order to compensate for the relative movement between the pressure applying arms and the roll swing arm brackets and also apply tension to the belts, pulleys 488 are positioned upon blocks 489 in the pulley brackets, the blocks being weighted and positioned in slideways on opposed pulley brackets, as shown in Fig. 30. The pulleys 484, 485 and 486 are supported for rotation on shafts 491, 492 and 493 extending between and through all of the pulley brackets. The pulley blocks 489 being supported for slidable movement they will move up and down in the guideways to maintain a substantially uniform tension on the belts 487. The gears 476 and 477 are so arranged that the tensioning roll 473 will be driven in the direction of rotation of the upper calender roll but at a lesser speed, whereby a drag is applied to the sheet as it passes over the roll.

Thus, in the present invention the tensioning mechanism is located directly on the top roll. A certain amount of tension must, of course, be maintained on the sheet between the unwind mechanism and the calender, but this is only sufficient to prevent flapping of the sheet. The majority of the tension is applied by the belts acting against the sheet on the top roll.

Attention is directed to the fact that should a break occur in the sheet as it leaves the unwind mechanism, the tail end of the sheet will pass into the first nip under tension almost until the very edge of the break reaches this nip, thus giving the operator an opportunity to release the pressure from the rolls before damage occurs. Furthermore, the number of breaks are reduced because of the low tension in the draw.

An additional advantage of this construction lies in the fact that the spaced belts can be adjusted lengthwise of the top roll to compensate for a difference in tension across the width of the sheet due to unevenness of the sheet as it is unwound from the roll. In other words, flappy edges may be tensioned for proper feeding by adjustment of the belts on the top roll.

*Indicating and control mechanism*

This embodiment of the invention includes electrical means for indicating the pressure being applied to the rolls and for indicating the difference in pressure on the opposite ends of the rolls. This means includes Selsyn transmitters driven directly from the shafts 463 and 464 and a differential Selsyn receiver having a dial associated therewith for indicating the difference in the rotative positions of the two Selsyn transmitters, thereby indicating the difference in pressure between the two ends of the rolls. A third Selsyn transmitter is so connected to the control mechanism as to rotate a second Selsyn receiver in amount depending upon the pressure to be applied to the rolls, the Selsyn receiver being associated with a second dial for indicating visually the amount of pressure. Worms 494 and 495 are positioned upon the shafts 463 and 464 and worm gears 496 and 497 are affixed to the shafts 498 and 499 of Selsyn transmitters 501 and 502. The transmitters 501 and 502 are supported on brackets 503 and 504 secured to the cross-member 448. The worms and worm gears are enclosed in casings 505 and 506. A gear segment 507 is pivotally secured to the pressure applying arm 424 and is provided with a lever 508 to which is pivotally attached one end of a rod 509, the other end of the rod 509 being pivotally attached to the swing arm bracket 422, as shown at 511, whereby relative movement between the pressure applying arm and the bracket brings about rotation of the segment 507. A bearing housing 512 supported on the top of the pressure applying arm 424 supports a shaft 513 on bearings 514, a gear 515 being secured to one end of the shaft 513 on a position to be driven through rotation of the segment 507. A contact arm 516 having a brush 517 at the end thereof is secured to the opposite end of the shaft 513 and a disc 518 is rotatably mounted on the shaft 513 between the contactor arm 516 and the housing 512 through a hub 519 and bearings 521. The hub 519 is provided with gear teeth 522 arranged to drive a gear 523 secured to the shaft of a Selsyn transmitter 524. The outer periphery of the disc 518 is provided with teeth 525 adapted to cooperate with a spur gear 526 on a motor 527, the motor 527 being mounted on the pressure applying arm 424. A coiled spring 528 acts between the bearing housings 512 and the hub of the gear 515 to keep backlash out of the gear and lever train comprising the rod 509 and the segment 507. Thus, the position of the contactor arm 516 is determined by the relative positions of the pressure applying arm 424 and the roll swing arm bracket 422, while the rotative position of the disc 518 is controlled by operation of the motor 527 from the control mechanism.

Attention is now directed to Fig. 31 wherein the wiring diagram of the third embodiment of the invention is shown. The numbers 529 and 531 designate the bus wires of the alternating current control circuits and are connected directly to the exciting fields of the Selsyn transmitters 501, 502, 524 and a Selsyn receiver designated generally by the numeral 532. The bus wire 531 is also directly connected through a brush 533 and contact strip 534 to a sub-bus wire 535, energizing this wire. As in the previous embodiments, the lower roll 46 of the calender stack is driven from a motor 47 controlled by a switch 536. The coil of a solenoid switch 537 is connected to the motor control circuit so that when the motor is energized the solenoid switch is held in the open position, whereas when the motor is deenergized, the switch will close to move the pressure applying arms to the "pressure off" position as will presently be described. Assuming that the pressure applying arms occupy the "rolls apart" position, as shown in Fig. 31, it is then only possible to move them downward into one of the lower positions. This is accomplished through depression of the manually operated switch 538 located on the control panel. Current then flows from the bus wire 529 through the contacts 539 of an inching switch 541, then through the switch 538 to the coil of a solenoid operated switch 542 which serves to close the terminals 543 of the motor 469 connecting the motor to the power supply lines 544 and causing the motor to rotate in a direction to advance the pressure applying plungers downward. The current passes from the switch 542 to a circular contact strip 545 near the periphery of the disc 518 and thence through the brush 517 to the sub-bus wire 535. As in previous embodiments, when the solenoid coil 542 is energized, a holding switch 546 is closed, completing a circuit from the solenoid switch 542 through the contacts 539 to the bus wire 529. The motor will then operate until the brush 517 rides off from the contact strip 545, breaking the circuit through the solenoid switch 542. Movement of the brush 517 is brought about by relative movement between the pressure applying arm 424 and the roll swing arm bracket 422, causing rotation of the segment 507 and consequently of the brush arm 516. The position of the pressure applying arms when the motor stops will depend upon the position of the disc 518, the position of the disc being recorded on a dial 547 associated with the Selsyn receiver 532. As the parts are shown in Fig. 31, the pressure applying arms will stop when they have reached the "pressure off" position. However, suppose that the operator had desired to run the pressure applying arms down to a "pressure on" position in which, say, 50 tons of pressure, was applied to the rolls. In that case, he would have depressed a manually controlled switch 548, causing rotation of the motor 527, whereby to rotate the disc 518 until 50 tons of pressure were indicated on the dial 547. In that case, the motor 469 would have continued to operate until the brush 517 rode off the contact strip 545, as previously described. However, the brush 517 would have been required to travel a greater distance, the increased distance being directly proportionate to the amount of rotation imparted to the disc 518. On the other hand, suppose that the pressure applying arms have been run down to the "pressure off" position, as described in the first example, and the operator desired to apply the 50 tons of pressure. The switch 548 would then be closed until the dial 547 indicated the desired pressure, whereupon the manually controlled switch 538 would again be depressed as a result of which the motor 469 would run until the circuit was broken on the segment 545 of the disc 518.

Suppose now that the operator desires to relieve the pressure from the rolls and bring the pressure applying plungers to the "pressure off" position. A manually controlled switch 549 would then be depressed and current would flow from the bus wire 529 through the switch contacts 539, through the switch 549, the solenoid operated switch 551, the rolls apart limit switches 552 aud 553, the pressure off limit switches 554 and 555, and back to the sub-bus wire 535, whereby the terminals 556 on the motor 469 would be closed, causing the motor to operate in a direction to raise the pressure applying plungers. A holding switch 557 would cause the solenoid operated coil 551 to remain closed until the circuit was broken at one of the "pressure off" limit switches 554 and 555. The "pressure off" limit switches act between the roll swing arm brackets 422 and 423 and the pressure applying arms 424 and 425 and are arranged to be broken as a result of relative movement between the pressure applying arms and the brackets after the pressure has been relieved from the pressure applying springs 433 and 434. To accomplish this, the rods 443 and 444 and slots 445 are so arranged that when the pressure is relieved from the rolls the pressure applying arms would continue to move upward a small distance after the lower end of the bolts 438 and 439 lift off from the spring caps 435 and 436, this small amount of movement occurring before the brackets 422 and 423 begin to be lifted by the pressure applying arms.

In order to increase the pressure of the left end of the rolls facing Fig. 31, the operator closes the manually controlled switches 558 and 541. Current then flows from the bus wire 529 through the contacts 559 of the switch 541 through the solenoid 471 whereby the clutch 461 is released and through two solenoid operated switches 560 and 561, the solenoid and the switch 561 being so arranged that the switch does not close until after the operation of the solenoid, in other words, until after the release of the clutch 461. When the solenoid switch 561 is closed current will flow from the bus wire 529 through this switch and through the manually controlled switch 558, the solenoid operated coil 542, the solenoid switch 560 and back to the sub-bus wire 535. Simultaneously, with the rotation of the Selsyn transmitter 502 a difference in rotation of the two Selsyn transmitters 501 and 502 will have been developed which will indicate upon a dial 562 of a differential Selsyn receiver, this receiver being so arranged that only the difference in the rotation of the two Selsyn transmitters 501 and 502 will be recorded together with the direction of this difference. The differential Selsyn will also cause a rotation of the brush 533 in one direction or another, this brush and the contact strip 534 serving as a safety device to limit the difference in the pressure on the two opposite ends of the rolls. When this difference becomes excessive the brush 533 will have moved off the end of the contact strip 534 completely deenergizing the sub-bus line 535 and rendering the controls inoperative. Likewise, if it is desired to decrease the pressure on the left end of the rolls, the manually controlled switch 541 is moved to close the contact points 559 and the manually controlled switch 563 is closed. Here again, the solenoid 471 will release the clutch 461 and will close the solenoid operated switch 561, whereupon current will flow from the bus wire 529 to the switch 551, the switch 563, the solenoid operated switch 551, the "rolls apart" limit switches 552 and 553, the "pressure off" limits switches 554 and 555 and thence back to the sub-bus wire 535, causing the motor 469 to operate until the switch 541 is opened or the brush 533 rides off the contact strip 534. In order to slightly increase the pressure on the right hand side of the rolls facing Fig. 31, it is necessary to advance both pressure applying plungers by closing the circuit through the switch 538 and then reduce the pressure on the left hand end of the rolls in the manner already described.

To separate the rolls, the manually controlled switch 565 is closed whereby current flows from the sub-bus wire 535 through the switch 565, the "rolls apart" limit switches 533 and 522, the solenoid operated switch 551, the solenoid operated switch 537, associated with the motor for driving the rolls, and thence back to the bus wire 529 by way of the manually controlled switch 541. It will be seen that the solenoid control switch 537 must be closed in order for the pressure applying arms to be moved to their "rolls apart" position and this means that the motor 47 must be stopped. The motor 469 will continue to lift the pressure applying arms until one of the "rolls apart" limit switches 352 and 353 is broken.

Conclusions

The most readily apparent attribute of the present invention is the ease and facility with which the machine can be controlled. The construction of the machine is such that the control buttons for all operations may be located upon a single panel convenient for the operator. Thus, he may, standing at a single control station, start rotation of the rolls, move the rolls from the "rolls apart" to the "pressure off" position, apply any desired pressure to both ends of the rolls, inch either end of the roll up or down a desired amount to independently control the pressure on opposite ends of the roll, he may remove the pressure from the rolls at an instant's notice, and, from the same position, move the rolls to the "rolls apart" position. In contrast with the prior art, the operator stands before the control for the drive. With the old machine, when an operator saw a flag on the roll being unwound, the flag indicating a break in the sheet, he must have accepted one of two evils—he must either have stopped the stack with the pressure on and thus spoiled the sheet at the roll nips by either breaking the sheet or badly marking it, or he must have gone back to the machine and relieved the pressure from the rolls and then returned to the control board to stop the drive, in which case a good deal of the sheet would have passed through the rolls uncalendered. In remaking the splice all of this sheet wherein the paper was spoiled or was uncalendered must be torn up and consequently a considerable amount of sheet is destroyed. However, with our invention, the operator stands at the control board and waits until he sees the actual splice in the sheet pass up to the top roll. At this point he presses a button, relieving the pressure from the rolls and waits until the splice appears at the bottom of the machine, whereupon he immediately again applies the pressure. In this way, only a minimum amount of paper is wasted. Because of this delicate control mechanism and other structural features of the machine, especially the capacity to maintain accurate alignment of the rolls with its consequent advantages, the machines made in accordance with the present invention are operated at much higher speeds than the machines of the prior art.

A structural feature of the machine which renders it capable of improved performance is the resilient means interposed in the pressure applying train. Some of the desired functions of this means, which may advantageously be a coiled spring, as shown in the drawings, lies in the fact that it provides a stroke or movement between two or more elements of the pressure applying mechanism, which stroke or movement is utilized to operate control mechanisms which, in turn, controls the operation of the pressure applying mechanism and associated parts. This movement also provides an accurate and continuous indication of the pressure being applied to the rolls. Another result of this construction is the fact that resiliency is provided to the pressure applying mechanism so that lopsided rolls may rotate without unduly increasing the pressure on the sheet and thereby damaging the same through their rotation.

The means for applying the pressure is so constructed and arranged that the springs may be rapidly and accurately compressed to any desired extent. In the constructions of the prior art utilizing lever systems and the like, excessive movement of the weight is required which gives to the whole system an objectionable inertia and the weight lifting and replacing operations require such time as to prevent rapid control of the machine. Furthermore, a considerable amount of friction is developed at the pivotal points of these lever systems which prevent accurate control, whereas in the present construction this element of friction is practically eliminated. The present pressure applying construction is also so arranged that the same mechanism may be employed for raising the rolls or lifting them to the "rolls apart" position as is employed for applying the pressure to the rolls.

In the third form of the invention above described, the resilient means is interposed between the pressure applying arms and the roll supports for the upper roll. Through this mechanism the amount of inertia to the movement of the rolls under pressure is materially reduced, that is, the weight of the pressure applying arm need not be moved if one or more of the rolls is lopsided, thereby further facilitating the resiliency of the structure.

The improved tensioning mechanism is such as to materially reduce the number of breaks in the sheet between the unwind mechanism and the calender, due to the fact that the tension on the sheet between these two points is materially lower than has heretofore been possible. Furthermore, this construction serves to hold the tail end of the sheet tensioned as it passes between the first nip of the calender, giving the operator sufficient time to remove the pressure from the rolls. In turn, this reduces the damage to the paper or fibre rolls caused by uneven thicknesses of material passing through the nips. Another desirable result accomplished by this mechanism is that where a sheet passing into the calender has flappy edges the tensioning mechanism may be so set as to feed the sheet evenly into the calender.

While we have thus described and illustrated specific embodiments of our invention, we are aware that numerous alterations and changes may be made therein without materially departing from the spirit of the invention and the scope of the appended claims, in which—

We claim:

1. In a calender machine having a stack of calender rolls, means for applying pressure to said rolls comprising lever mechanism for imparting pressure to said rolls, a power transmitting element arranged to transmit power to said lever to apply pressure thereto, a prime mover, worm and screw mechanism driven by said prime mover arranged to drive said power transmitting element, and a compressible member located between said prime mover and said rolls to lend resiliency to the pressure applying mechanism.

2. In a calender machine having a stack of calender rolls, a reversible prime mover, lever mechanism for imparting pressure to said rolls, a power transmitting element actuated by said prime mover to apply pressure to said lever upon movement of said prime mover in one direction, and means attached to said lever for separating the rolls through reversal of said prime mover.

3. In a calender machine having a stack of calender rolls, pressure applying plungers movable between limits to apply and relieve the pressure on said rolls, and movable in one direction beyond said limits to separate said rolls, and means associated with said plungers to separate said rolls in response to movement of the plunger beyond said limits.

4. In a calender machine having a stack of calender rolls, means for applying pressure to said rolls comprising pressure applying plungers for applying pressure to opposite ends of said rolls, means for moving the pressure applying plungers as a unit to simultaneously control the pressure on opposite ends of the rolls, and means for separately moving the plungers to independently control the pressure at each end of said rolls.

5. A supercalender comprising a frame having vertical columns, a power driven lower roll mounted thereon, a plurality of intermediate rolls mounted on said columns above said lower roll to swing about pivot points on said columns, an upper roll, pressure applying arms pivotally supported at one end on said columns, means intermediate the ends of said arms for supporting said upper roll in a position to bear against the uppermost of said intermediate rolls, and means for applying pressure to the opposite ends of said arms for urging the rolls together.

6. In a calender machine having a stack of calender rolls, means for applying pressure to and separating said rolls comprising pressure applying arms located at opposite ends of one of said rolls having a pivotal support at one end and arranged to bear against said rolls intermediate their ends, coiled compression spring located at the opposite ends of said arms, worm gear screw-down mechanism arranged to compress said spring and apply pressure to said rolls and to move said one of said rolls to an elevated position, and a prime mover for driving said screw-down mechanism.

7. A calender machine comprising a stack of calender rolls, pressure applying plungers for applying calendering pressure to the ends of said rolls, power operated means for simultaneously moving the plungers at the same rate, supplementary power operated means for independently moving each of the plungers, and means for limiting the difference in movement of said plungers.

8. A calender machine comprising a stack of calender rolls, pressure applying plungers for applying calendering pressure to the ends of said rolls, power operated means for simultaneously moving the plungers to apply said pressure having means to be set for automatically terminating said movement, and power operated means for independently moving said plungers to independently alter said pressure, and for adjusting said setting means.

9. A calender machine comprising a stack of calender rolls, pressure applying units for applying calendering pressure to the ends of said rolls, prime movers for driving said units, and control means remote from said prime movers arranged to be selectively actuated to initiate movement of said units in unison to apply pressure to said rolls, and actuated for independent movement thereof to regulate the pressure on the ends of said rolls.

10. A calender machine comprising a stack of calender rolls, pressure applying units for applying calendering pressure to the ends of said rolls, prime movers for driving said units in pressure applying movements, and control means including means to be actuated to initiate movement of said units and means to be set to automatically terminate such movement when predetermined pressure is applied to said rolls.

11. A calender machine comprising a stack of calender rolls, a pair of pressure applying plungers, movable for applying calendering pressure to said rolls, compressible means interposed between said plungers and said rolls to transmit the pressure to the latter, and means responsive to the change in said compressible means for controlling the movement of said plungers and for indicating the pressure on said rolls and the direction of movement of said plungers.

12. A supercalender comprising a stack of calender rolls having a stationary lower roll rotatable on a fixed axis, a stack of intermediate rolls and an upper roll movable toward and away from each other, movable means supporting the said upper roll through the medium of which calendering pressure is applied to the rolls, pivotally supported pressure applying arms, resilient means interposed between said arms and said upper roll supporting means, and means for rotating said arms to apply a calendering pressure to said rolls through said resilient means.

13. A supercalender comprising a stack of calender rolls having a stationary lower roll rotatable on a fixed axis, a stack of intermediate rolls, and a top roll movable toward and away from each other, movable means supporting said upper roll through the medium of which calendering pressure is applied to the rolls, pressure applying arms movable between a pressure-off, a pressure-on and a rolls-apart position, resilient means interposed between said arms and said top roll supporting means for applying a calendering pressure to said rolls when said arms are moved from the first to the second mentioned position, means for moving said arms from the first and second positions to said last mentioned position, and means for separating said rolls when said arms are moved into said last mentioned position.

14. In a supercalender having a stack of calender rolls, a pivotally supported arm for applying pressure thereto, a pressure applying plunger having slidable and pivotal contact with said arm, power operated means for moving said plunger longitudinally, spring means acting between said plunger and said arm to apply pressure to said rolls when said plunger is moved in one direction from a central pressure-off position, and means acting between said plunger and said arm for rotating the latter when the plunger is moved in the opposite direction from said position.

15. A calender machine comprising a stack of calender rolls, pressure applying plungers for applying calendering pressure to the ends of said rolls, power operated means for simultaneously moving the plungers to apply said pressure, and clutch means releasable to independently move said plungers to apply different pressure to the ends of said rolls.

16. In a calender machine having calender rolls, pressure applying mechanism movable to apply pressure to the rolls and to separate them, and control means for selectively initiating movement of said pressure applying mechanism and for automatically interrupting the same responsive to said movement.

17. In a calender machine, a stack of calender rolls, pressure applying mechanism movable to apply pressure to the rolls, and control means for initiating said movement, arranged to be set to automatically interrupt said movement when the pressure on each end of said rolls reaches a predetermined amount.

18. A supercalender having power operated means for applying calendering pressure independently to each end of the rolls, including means adapted to be initially set for predetermining the pressure to be applied to each end, and means whereby said pressure may be quickly relieved and subsequently automatically applied at the same predetermined pressure in response to said initial setting.

19. A supercalender having power operated means for applying calendering pressure independently to each end of the rolls, including means adapted to be set for predetermining the pressure to be applied to each end, and means whereby said pressure may be quickly relieved and the operation of the machine interrupted and whereby said setting is not disturbed by said interruption in the operation of the machine.

20. A supercalender having power operated means for applying calendering pressure independently to each end of the rolls and for indicating the amount of the pressure so applied to each end.

21. A supercalender having power operated means for applying calendering pressure independently to each end of the rolls, and calibrated means for indicating the amount of the pressure so applied to each end.

22. A supercalender having power operated means for applying calendering pressure to the rolls and for subsequently relieving said pressure, and a control mechanism for said means operable for securing varying degrees of calendering pressure according to a predetermined setting and for bringing said calendering pressure back to said predetermined setting after relief of said pressure and interrupting said pressure of said machine.

23. A supercalender comprising in combination, means for bringing the rolls into contact position, means for applying calendering pressure to the rolls, means for removing the pressure from the rolls, means for separating the rolls to a rolls-apart position, and means under the control of the operator at a remote point for selectively initiating operation of said various means.

24. A supercalender having power operated means to apply varying degrees of calendering pressure to the rolls and to separate the rolls, pressure indicating means and means for controlling said power operated means whereby to vary the degree of calendering pressure to obtain determined pressure results shown by said pressure indicating means.

25. In a calender machine having a stack of calender rolls, means for applying pressure to said rolls comprising pressure applying plungers for applying pressure to opposite ends of said rolls, means for moving the pressure applying plungers as a unit to simultaneously regulate the pressure on opposite ends of the rolls, and means for separately moving the plungers to independently regulate the pressure at each end of said rolls, and control means located at a remote point for controlling the application and release of pressure on said rolls.

26. A supercalender comprising a stack of calender rolls, a pair of pressure applying arms for urging said rolls together, and means for controlling said pressure applying arms comprising, pressure applying plungers acting against said arms, means for driving each of the plungers at the same rate to apply pressure to said rolls, and means associated with one pressure applying plunger for terminating the operation of said plungers when the pressure on said rolls reaches a predetermined maximum.

27. A supercalender comprising a stack of calender rolls, a pair of pressure applying arms for urging said rolls together, and means for controlling said pressure applying arms comprising, pressure applying plungers acting against said arms, means for driving each of the pressure applying plungers at the same rate, supplemental means for independently driving the plungers to apply different pressures to the arms, and means associated with one plunger arranged to be adjusted through operation of said supplemental means for terminating movement of said plungers when the pressure on said arms reach predetermined maximums.

28. A supercalender comprising a stack of calender rolls, a pair of pressure applying arms for urging said rolls together, and means for controlling said pressure applying arms comprising, pressure applying plungers acting against said arms, means for driving each of the plungers at the same rate, supplemental means for independently driving the plungers to apply different pressure to the arms, and means for limiting the travel of said plungers under the power of said supplemental driving means.

29. A supercalender comprising a stack of calender rolls, a pair of pressure applying arms for urging said rolls together, and means for controlling said pressure applying arms comprising, pressure applying plungers acting against said arms, means for driving each of the plungers to move said arms between pressure-off, pressure-on and rolls-apart positions, and supplemental means for independently driving said plungers when said arms occupy the pressure on position, to apply different pressures to said arms.

30. A supercalender comprising a stack of calender rolls, a pair of pressure applying arms for urging said rolls together, and means for controlling said pressure applying arms comprising, pressure applying plungers acting against said arms, means for driving each of the plungers to move said arms between pressure-off, pressure-on the rolls-apart positions, and means actuated through movement of said arms to stop movement of the arms when they move from the pressure-on to the pressure-off position.

31. In a calender machine having a stack of calender rolls, means for driving said rolls, means for applying pressure to said rolls comprising, pressure applying plungers for applying pressure to opposite ends of said rolls, means for moving the pressure applying plungers as a unit to simultaneously control the pressure on opposite ends of the rolls, means for separately moving said plungers to independently control the pressure at each end of said rolls, control means located at a remote point for controlling the application and release of pressure on said rolls, and means independent of said last mentioned means for releasing said pressure when said rolls cease to be driven.

32. In a calender machine having a stack of calender rolls, means for driving said rolls, means for applying pressure to said rolls, and means responsive to said driving means for automatically releasing the pressure from said rolls.

33. A calender machine comprising a stack of calender rolls, pressure applying plungers for applying calendering pressure to the ends of said rolls, power operated means for simultaneously moving the plungers at the same rate, supplementary power operated means for independently moving each of the plungers, and means for preventing operation of said supplemental means when pressure is not applied to said rolls.

34. A calender machine comprising a stack of calender rolls, means movable to separate said rolls and bring them together, means acting on said first mentioned means for moving the same between said positions and for applying calendering pressure to said rolls, and control means having devices to be successively actuated to initiate the removal of pressure from said rolls and the separation of said rolls, and to terminate movement at each of said positions responsive to the movement of the parts.

35. A calender machine comprising a stack of calender rolls, worm and screw mechanism for applying calendering pressure to the ends of said rolls, a prime mover for moving said mechanism between a pressure-off and a pressure-on position, supplementary prime movers operative through said mechanism for making small independent changes in pressure at the ends of said rolls, and remote control means selectively operative when said mechanism occupies the pressure-on position to remove the pressure from both ends of said rolls and to increase or decrease the pressure at either end thereof.

36. A calender machine as set forth in claim 35 wherein said control mechanism is provided with means for automatically limiting the magnitude of said independent changes in pressure at the ends of the rolls.

37. A calender machine comprising a stack of calender rolls, a pair of worm and screw units for applying calendering pressure to the ends of said rolls, a prime mover for moving said units in unison between a pressure-off and a pressure-on position, supplementary prime movers each operative through one of said units for making independent changes in pressure at the ends of said rolls, and remote control means selectively operative when said mechanism occupies the pressure-on position to increase and decrease the pressure at either end of said rolls and to remove the pressure from both ends of the rolls, said control being arranged to automatically terminate the movement of the parts at said pressure-off position in response to the movement of said worm and screw units.

38. A calender machine comprising a stack of calender rolls, pressure applying plungers movable to apply calendering pressure to the ends of said rolls, power operated means for moving said plungers in unison to apply equal pressures on the ends of said rolls, means for independently moving said plungers to apply unequal pressure to the ends of said rolls, Selsyn transmitters driven by said power operated means responsive to the movement of said plungers, a Selsyn differential receiver connected to said transmitters to indicate the difference in the rotative positions of said transmitters, and dial means associated with said receiver to indicate the difference in pressure on the ends of said rolls.

39. A calender machine comprising a stack of calender rolls, pressure applying plungers movable to apply calendering pressure to the ends of said rolls, power operated means for moving said plungers in unison to apply equal pressures on the ends of said rolls, means for independently moving said plungers to apply unequal pressure to the ends of said rolls, Selsyn transmitters driven by said power operated means responsive to the movement of said plungers, a Selsyn differential receiver connected to said transmitters to indicate the difference in the rotative positions of said transmitters, dial means associated with said receiver to indicate the difference in pressure on the ends of said rolls, and means operated by said receiver for limiting the difference in movement of said plungers.

40. A calender machine comprising a plurality of parallelly disposed calender rolls, means for pressing said rolls together to compress a sheet therebetween, and visual means for indicating the pressure applied to said rolls.

41. A calender machine comprising a plurality of parallelly disposed rolls, means for supporting said rolls for movement toward and away from each other, compressible means for applying pressure to at least one of said rolls to urge said rolls together to compress a sheet therebetween, and means responsive to said last mentioned means for indicating to the operator the pressure applied to said roll.

42. A calender machine comprising a plurality of parallelly disposed rolls, means for supporting said rolls for movement toward and away from each other, compressible means for applying pressure to opposite ends of at least one of said rolls to urge said rolls together to compress a sheet therebetween, remote control means for independently controlling the application of pressure to each end of said roll, and means responsive to said compressible means for indicating to the operator at said remote point the pressure applied to opposite ends of said roll.

43. In a calender machine having a plurality of parallelly disposed rolls and means for supporting the rolls for movement toward and away from each other, means for applying pressure to said roll comprising power operated driving mechanism, a compressible element arranged to transmit power from said mechanism to one of said rolls, and means responsive to the distortion of said compressible element for indicating the pressure applied.

44. In a calender machine having a plurality of parallelly disposed rolls and means for supporting the rolls for movement toward and away from each other, means for applying calendering pressure to said rolls comprising, power operated pressure applying mechanism, a spring arranged to transmit pressure from said mechanism to one of said rolls, and means responsive to the distortion of said spring for indicating the pressure applied to said roll.

45. In a calender machine having a plurality of parallelly disposed rolls and means for supporting the rolls for movement toward and away from each other, means for applying calendering pressure to said rolls comprising, power operated pressure applying mechanism, compression elements arranged to transmit power from said mechanism to one of said rolls, and a hand and dial responsive to the distortion of said compression element for indicating the pressure applied to said rolls.

46. A calender machine comprising a plurality of parallelly disposed rolls, means for supporting said rolls for movement toward and away from each other, means for independently applying calendering pressure to opposite ends of at least one of said rolls or urge said rolls together and compress a sheet therebetween, remote control means for controlling the application of pressure to said rolls from a remote control station, a dial visible from said control station, and concentrically mounted hands for indicating on a single dial the pressure applied to each end of said roll.

47. In a calender machine having a plurality of parallelly disposed rolls and means for supporting the rolls for movement toward and away from each other, means for applying calendering pressure to said rolls comprising, coiled compression springs acting at opposite ends of at least one of said rolls, means for independently exerting a pressure against said coiled springs to urge said rolls together, a dial, and concentrically mounted hands each responsive to the change in length of one of said springs for indicating on a single dial the pressure applied to each end of said roll.

48. A calender machine comprising a stack of calender rolls having a lower roll rotatable on a fixed axis, a stack of intermediate rolls movable toward and away from each other and an upper roll arranged to urge said rolls together, a pressure applying plunger arranged to support said upper roll, said plunger being movable between a pressure-off position and a pressure-on position, resilient means between said roll and said plunger for transmitting pressure from the latter to the former, and means responsive to said resilient means for indicating the pressure on said upper roll.

49. A calender machine comprising a stack of calender rolls having a lower roll rotatable on a fixed axis, a stack of intermediate rolls, and an upper roll, means for pivotally supporting said intermediate rolls for movement toward and away from each other, a pivotally supported pressure applying arm arranged to support said upper roll and compress said intermediate rolls against said lower roll, a compression spring acting against said arm, means for applying pressure to said arm through said spring to rotate said arm from the former to any of the latter positions, and means responsive to the change in length of said spring for indicating the pressure applied to said upper roll.

50. A calender machine comprising a stack of calender rolls having a lower roll rotatable on a fixed axis, a stack of intermediate rolls, and an upper roll, means for pivotally supporting said intermediate rolls for movement toward and away from each other, pivotally supported pressure applying arms arranged to support said upper roll and compress said intermediate rolls against said lower roll, compression springs acting against said arms, means for applying pressure to said arms through said springs, said means comprising pressure applying plungers having pressure foot arranged to bear against one end of said springs and means for advancing said plungers, and means for indicating relative movement between said pressure applying arms and said plungers in a direction at right angles to said arms to measure the pressure on said upper roll.

51. A calender machine comprising a frame having vertical columns, a stack of calender rolls supported on said columns, at least one pressure applying arm pivoted at one end upon said frame and arranged intermediate its ends to transmit calendering pressure against at least one of said rolls, and pressure applying means for applying calendering pressure to said rolls through said arm, said pressure applying means being pivotally connected to said frame and to the opposite end of said arm whereby to rotate on said frame with rotation of said arm.

52. A calender machine comprising a frame having a longitudinal slot and a plurality of spaced transverse keyways, a plurality of superimposed calender rolls, roll swing arms for pivotally supporting said rolls on said frame, and means for securing said arms on the frame comprising pivotal bearings having at least one keyway, means on said bearings for engaging said slot, and keys for simultaneously engaging keyways in said frame and said bearings.

53. A calender machine comprising a frame, a plurality of super-imposed calender rolls, means for driving at least one of said rolls, roll swing arms for supporting at least a part of said rolls on said frame, pivotal bearings on said arms and means for supporting said bearings at any of a plurality of positions on said frame including a plurality of opposed keyways on said bearing and on said frame and at least one key arranged to be positioned in complemental keyways of the bearing and frame.

54. A calender machine comprising a frame having a plurality of equally spaced keyways, a plurality of superimposed calender rolls, means for driving at least one of said rolls, roll swing arms for supporting at least a part of said rolls on said frame, pivotal bearings on said arms each having at least two keyways spaced differently from the keyways on said frame, and a key arranged to simultaneously engage a keyway on said frame and on said bearing to locate said bearing on said frame at any of a plurality of locations depending upon the size of said rolls.

55. A calender machine comprising a stack of calender rolls between which a sheet is passed to be calendered, and means contacting the sheet between the first nip and the line of initial contact of the sheet with the first roll for tensioning the sheet.

56. A calender machine comprising a frame having vertical columns, a power driven lower roll mounted thereon, a plurality of intermediate rolls mounted on said columns above said lower roll to rotate about pivot points on said columns, an upper roll, pressure applying arms pivotally supported at one end on said columns, power operated means at the opposite ends of said arms for rotating the same between a rolls-apart position, and a pressure-off position, and for applying pressure to said rolls, means intermediate the ends of said arms for transmitting pressure to said upper roll, and means for separating said rolls when said arms are moved to the rolls-apart position.

57. A calender machine comprising a frame, a power driven lower roll, a stack of intermediate rolls positioned above said lower roll normally in superimposed contact, roll swing arms pivoted upon said frame for supporting said rolls thereon, an upper roll, pressure applying arms pivoted on said frame and arranged to be moved in one direction to apply pressure to said top roll and in the opposite direction for separating said rolls, and means connecting said pressure applying arm and said roll swing arms to separate said rolls.

58. A calender machine comprising a frame, a power driven lower roll, a stack of intermediate rolls positioned above said lower roll normally in superimposed contact, roll swing arms pivoted upon said frame for supporting said rolls thereon, an upper roll, a pressure applying arm pivoted on said frame and arranged to move in one direction to apply pressure to said top roll and in the opposite direction for separating said rolls, and a lift bar supported on said pressure arm arranged to act upon said roll swing arms to lift said rolls in succession and separate said rolls.

59. A calender machine comprising a stack of calender rolls having a stationary lower roll, a stack of intermediate rolls, and an upper roll, means for pivotally supporting said intermediate rolls for movement toward and away from each other, a pivotally supported pressure applying arm arranged to support said upper roll and compress said intermediate rolls against said lower roll, said arm being rotatable between a pressure-off position, and a rolls-apart position, resilient means for applying a calendering pressure to said arms in said first mentioned position, means for moving said arm from said first and second mentioned positions to said last mentioned position, and means acting between said pressure applying arm and said first mentioned means for separating said rolls when said arm is moved to said last mentioned position.

60. A supercalender adapted for use with an unwind and rewind mechanism, comprising a stack of calender rolls, pressure indicating mechanism visible from a central point adjacent to said rewind mechanism at which the condition of the sheet being rewound and operation of the rolls are clearly visible, and remote control means manually operable from said central point for selectively bringing the rolls into contact, applying calendering pressure to the rolls, removing the pressure from the rolls, and separating the rolls in response to said observations.

61. A calender machine comprising a stack of calender rolls between which a sheet is adapted to pass to be calendered, at least one belt arranged to press the sheet against a calender roll as it enters the stack, and means for driving said belt in the direction of travel of the sheet at a lesser speed than said roll whereby a drag is produced on the sheet to tension the same.

62. A calender machine comprising a vertical stack of calender rolls between which a sheet is adapted to pass from top to bottom to be calendered, a plurality of narrow belts arranged to press the sheet against the top roll as it enters the stack, and means for driving said belts in the direction of travel of the sheet at a lower speed than said roll whereby a drag is produced on the sheet to tension the same.

63. A calender machine comprising a vertical stack of calender rolls between which a sheet is adapted to pass to be calendered, a plurality of narrow belts arranged to press the sheet against a calender roll as the sheet enters the stack, said belts being spaced lengthwise of said roll, means for altering the position of said belts in accordance with the sheet being calendered, and means for driving said belts in the direction of travel of the sheet at a lower speed than said roll, whereby a drag is produced on the sheet to tension the same.

64. A calender machine comprising a vertical stack of calender rolls between which a sheet is adapted to pass to be calendered, a plurality of narrow belts to press the sheet against a calender roll as the sheet enters the stack, said belts being spaced lengthwise of said roll, and means for driving said belts from said roll in the direction of travel of the sheet and at a lower speed than said roll, whereby a drag is produced on the sheet to tension the same.

65. A calender machine comprising a vertical stack of calender rolls between which a sheet is adapted to pass from top to bottom to be calendered, a plurality of narrow belts arranged to press the sheet against the top roll as it enters the stack, a pair of pressure applying arms having means thereon for supporting said belts, spring means between said pressure applying arms and said top roll for applying pressure to said rolls, means for driving said belts in the direction of travel of the sheet at a lower speed than said roll, whereby a drag is produced on the sheet to tension the same, and means compensating for relative movement between said arms and said roll to maintain a substantially uniform tension on said belts.

66. A super calender comprising a stack of calender rolls having a lower roll rotatable on a fixed axis, a stack of intermediate rolls and an upper roll movable toward and away from each other, a pivoted arm supporting said upper roll, a pressure applying arm movable between a position in which said rolls rest in contact with each other and a position in which pressure is applied to said rolls, and resilient means interposed between said pressure applying arm and said roll supporting arm for applying calendering pressure to said rolls.

67. In a calender machine having a stack of calender rolls, pivoted means supporting one of the upper rolls and movable to apply calendering pressure to the rolls, a pivotally supported arm for applying pressure to said means, resilient means interposed between said arm and said roll supporting means, pressure applying mechanism pivotally connected to one end of said arm, and power operated means for driving said mechanism to rotate said arm and apply pressure to said rolls through said resilient means.

68. In a calender machine having a stack of calender rolls, means for applying pressure to said rolls comprising a prime mover, lever mechanism for imparting pressure to said rolls, screwdown mechanism actuated by said prime mover to apply pressure to said lever mechanism, and a compressible member located between said prime mover and said rolls to lend resiliency to said pressure applying mechanism.

69. A supercalender having power operated means for applying calendering pressure simultaneously to each end of the rolls and for independently regulating the pressure at each end of the rolls, and control means for quickly relieving said pressure and subsequently automatically applying said pressure at the same pressure upon initiation of said pressure applying means.

70. A calender machine comprising a stack of calender rolls, pressure applying plungers for applying calendering pressure to the ends of said rolls, power operated means for simultaneously moving the plungers at the same rate, supplementary power operated means for independently moving each of the plungers to apply or relieve pressure, and means at a point remote from said power operated means to control the operation thereof to regulate the operation of the rolls.

71. A calender machine comprising a frame, a stack of calender rolls supported thereon, a pair of rigidly interconnected pressure applying units supported for rotation on said frame in unison, said units having elements movable to apply calendering pressure to the ends of said rolls, a prime mover for simultaneously actuating said pressure applying units, to apply calendering pressure, and supplementary prime movers for independently actuating said pressure applying units to make independent changes in pressure at the ends of said rolls.

72. A calender machine comprising a plurality of parallelly disposed rolls, means for supporting said rolls for movement toward and away from each other, means for progressively applying pressure to at least one of said rolls to urge said rolls together to compress a sheet therebetween, and means for indicating to the operator the pressure applied to said roll.

73. In a calender machine having a plurality of parallelly disposed rolls, and means for supporting the rolls for movement toward and away from each other, compressible means acting at opposite ends of at least one of said rolls, means for exerting pressure against said compressible means to urge said rolls together, and means responsive to said compressible means for indicating the pressure applied to said rolls.

74. A calender machine comprising a stack of calender rolls, pressure applying plungers movable for applying calendering pressure to the ends of said rolls, Selsyn transmitters rotated by movement of said plungers, and a differential Selsyn receiver located at a point of control arranged to indicate the difference between the positions of said plungers to indicate the pressure on the ends of said rolls.

75. A calender machine comprising a stack of calender rolls, pressure applying units for applying calendering pressure to the ends of said rolls, prime movers for driving said units in pressure applying movements, and control means including means to be actuated to initiate movement of said units and means to be set to automatically terminate such movement when predetermined pressure is applied to said rolls, and to visually indicate the pressure on said rolls.

76. A calender machine comprising a stack of calender rolls, pressure applying plungers movable to apply calendering pressure to the ends of said rolls, and control means including means actuatable to initiate said movement, means arranged to be set to terminate said movement and a Selsyn transmitter and receiver connected with said last-mentioned means for indicating the pressure for which said last-mentioned means is set.

77. A calender machine comprising a plurality of parallelly disposed rolls, means for supporting said rolls for movement toward and away from each other, means for applying pressure to opposite ends of at least one of said rolls to urge said rolls together to compress a sheet therebetween, remote control means for independently controlling the application of pressure to each end of said roll, and means for indicating to the operator at said remote point the pressure applied to each end of said roll.

78. A calender machine comprising a plurality of parallelly disposed rolls, means for supporting said rolls for movement toward and away from each other, compressible means for independently applying pressure to opposite ends of at least one of said rolls to urge said rolls together to compress a sheet therebetween, a dial, and hands cooperable with said dial responsive to said compressible means for indicating to the operator the pressure applied to each end of said roll.

79. A calender machine comprising a stack of calender rolls having a stationary lower roll, a stack of intermediate rolls, and an upper roll, means for pivotally supporting said intermediate rolls for movement toward and away from each other, a pivotally supported pressure applying arm arranged to support said upper roll and compress said intermediate rolls against said lower roll, said arm being rotatable between a pressure-off position and a plurality of pressure-on positions, compressible means for rotating said arm from the former to any of the latter positions to apply varying amounts of pressure on said upper roll, and means actuating upon the compression of said compressible means for indicating the pressure on said upper roll.

80. A supercalender comprising a stack of calender rolls, a pair of pressure applying arms for urging said rolls together, and means for controlling said pressure applying arms comprising, pressure applying plungers acting against said arms, means for driving each of the plungers at the same rate, means for independently driving the plungers to apply different pressures to the arms, and means for limiting the difference in positions of said arms to prevent damage to the bearings of said rolls.

81. A supercalender comprising a stack of calender rolls, a pair of pressure applying arms for urging said rolls together, and means for controlling said pressure applying arms comprising, pressure applying plungers acting against said arms, means for driving each of the plungers at the same rate, means for independently driving the plungers to apply different pressures to the arms, and means for limiting the advancement of said plungers under the influence of said first-mentioned driving means.

82. A calender machine comprising a stack of calender rolls, power operated means for simultaneously applying calendering pressure to the ends of said rolls, supplemental power operated means for independently applying pressure to the ends thereof, and remote control means for said first-mentioned means arranged to be actuated to initiate the application of pressure to said rolls, and having means for automatically terminating such application at a predetermined maximum.

83. A calender machine comprising a stack of calender rolls, pressure applying plungers movable between a rolls-apart position to separate said rolls, a pressure-off position to bring said rolls into contact, and a pressure-on position to apply calendering pressure to said rolls, and control means arranged to be selectively actuated to initiate movement between said positions and having means automatically responsive to said movement to terminate such movement at each of said positions.

84. In a calender machine having a stack of calender rolls, a motor for driving said rolls, means for applying pressure to said rolls, and means rendered operative when said motor ceases driving said rolls, for relieving the pressure on said rolls.

85. In a calender machine having a stack of calender rolls, an electric motor for driving said rolls, means for applying pressure to said rolls, and means arranged to relieve the pressure on said rolls when the supply of electrical energy to said motor ceases.

86. A calender machine comprising a frame having vertical columns, a power driven lower roll, a stack of rolls positioned above said lower roll normally in superimposed contact, movable bearings for supporting said rolls, pressure applying means acting against the upper of said rolls, movable in one direction for applying pressure to said rolls and in the opposite direction for separating said rolls, and means acting between said pressure applying means and said bearings for separating said rolls.

CHARLES P. PUTNAM.
EARL E. BERRY.
LLOYD HORNBOSTEL.

CERTIFICATE OF CORRECTION.

Patent No. 2,058,352.  October 20, 1936.

CHARLES P. PUTNAM, ET AL.

It is hereby certified that error appears in the printed specification of the above numbered patent requiring correction as follows: Page 17, second column, line 32, claim 30, for the article "the" read and; and that the said Letters Patent should be read with this correction therein that the same may conform to the record of the case in the Patent Office.

Signed and sealed this 2nd day of February, A.D. 1937.

Leslie Frazer
Acting Commissioner of Patents.

(Seal)